United States Patent
Yamashita et al.

(10) Patent No.: US 12,031,605 B2
(45) Date of Patent: Jul. 9, 2024

(54) SHOCK ABSORBER

(71) Applicant: Hitachi Astemo, Ltd., Ibaraki (JP)

(72) Inventors: Mikio Yamashita, Hitachinaka (JP); Ryo Shinata, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 387 days.

(21) Appl. No.: 17/437,459

(22) PCT Filed: Jan. 10, 2020

(86) PCT No.: PCT/JP2020/000676
§ 371 (c)(1),
(2) Date: Sep. 9, 2021

(87) PCT Pub. No.: WO2020/195011
PCT Pub. Date: Oct. 1, 2020

(65) Prior Publication Data
US 2022/0163087 A1    May 26, 2022

(30) Foreign Application Priority Data

Mar. 26, 2019 (JP) ................. 2019-059207

(51) Int. Cl.
*F16F 9/348* (2006.01)
*F16F 9/06* (2006.01)

(52) U.S. Cl.
CPC .............. *F16F 9/348* (2013.01); *F16F 9/062* (2013.01)

(58) Field of Classification Search
CPC .. F16F 9/062; F16F 9/348; F16F 9/508; F16F 9/512
See application file for complete search history.

(56) References Cited

U.S. PATENT DOCUMENTS

| | | | |
|---|---|---|---|
| 9,500,251 B2 | 11/2016 | Rummel et al. | |
| 2015/0114774 A1* | 4/2015 | Kim | F16F 9/3485 |
| | | | 188/322.15 |

(Continued)

FOREIGN PATENT DOCUMENTS

| | | | | |
|---|---|---|---|---|
| EP | 905409 A2 * | 3/1999 | ............ | F16F 9/348 |
| JP | 3-123130 U | 12/1991 | | |

(Continued)

OTHER PUBLICATIONS

German Office Action received in corresponding German Application No. 11 2020 001 493.2 dated Aug. 9, 2023.

(Continued)

*Primary Examiner* — Vishal R Sahni
(74) *Attorney, Agent, or Firm* — MATTINGLY & MALUR, PC

(57) ABSTRACT

A shock absorber includes a first damping force generation mechanism provided in a first passage, and a second damping force generation mechanism provided in a second passage, in which the second damping force generation mechanism includes a first valve seat formed on a case member having a cylindrical part and a bottom part, a disc valve in which a separable part on an outer circumferential side is separably disposed on a first valve seat, and a second valve seat provided on a side of the disc valve opposite to the first valve seat and configured to support the disc valve on a radial inner side of the separable part, and the second passage includes a piston rod passage part formed by cutting out or penetrating the piston rod, and a chamber passage part which allows communication from the piston rod passage part to a case inner chamber.

5 Claims, 11 Drawing Sheets

(56) References Cited

U.S. PATENT DOCUMENTS

| | | | |
|---|---|---|---|
| 2015/0198214 A1 | 7/2015 | Mizuno | |
| 2015/0204408 A1 | 7/2015 | Morita | |
| 2016/0280031 A1 | 9/2016 | Tsukahara et al. | |
| 2018/0128341 A1* | 5/2018 | Mizuno .................... | F16F 9/19 |
| 2018/0245660 A1 | 8/2018 | Yamashita et al. | |
| 2019/0368569 A1* | 12/2019 | Yamashita ............... | F16J 15/16 |
| 2020/0003272 A1* | 1/2020 | Yamashita .............. | F16F 9/512 |

FOREIGN PATENT DOCUMENTS

| | | |
|---|---|---|
| JP | 2008-309214 A | 12/2008 |
| JP | 2012-067880 A | 4/2012 |
| JP | 2014-35050 A | 2/2014 |
| JP | 2014-62600 A | 4/2014 |
| JP | 2015-132313 A | 7/2015 |
| JP | 5949789 B2 | 7/2016 |
| JP | 2018-76920 A | 5/2018 |
| JP | 6391512 B2 | 9/2018 |
| WO | 2017/038571 A1 | 3/2017 |

OTHER PUBLICATIONS

1 Japanese Office Action received in corresponding Japanese Application No. 2021-508101 dated Jul. 26, 2022.
Indian Office Action received in corresponding Indian Application No. 202117040422 dated May 5, 2022.
International Search Report received in corresponding International Application No. PCT/JP2020/000676 dated Feb. 18, 2020.
Written Opinion received in corresponding International Application No. PCT/JP2020/000676 dated Feb. 18, 2020.

* cited by examiner

SHOCK ABSORBER

TECHNICAL FIELD

The present invention relates to a shock absorber.

Priority is claimed on Japanese Patent Application No. 2019-059207, filed in Japan on Mar. 26, 2019, the content of which is incorporated herein by reference.

BACKGROUND ART

A shock absorber having two valves that open in the same stroke has been disclosed (see, for example, Patent Documents 1 to 3).

CITATION LIST

Patent Document

[Patent Document 1]
Japanese Patent No. 5949789
[Patent Document 2]
Japanese Unexamined Patent Application, First Publication No. 2018-76920
[Patent Document 3]
Japanese Patent No. 6391512

SUMMARY OF INVENTION

Technical Problem

A structure of a shock absorber is required to be simplified.

Therefore, an objective of the present invention is to provide a shock absorber in which a structure can be simplified.

Solution to Problem

One aspect of a shock absorber of the present invention includes a first damping force generation mechanism provided in a first passage formed in a piston to generate a damping force, and a second damping force generation mechanism disposed on one chamber side with the piston rod inserted therethrough and provided in a second passage in parallel with the first passage to generate a damping force, in which the second damping force generation mechanism includes an annular first valve seat formed on a cylindrical part of a bottomed cylindrical case member having the cylindrical part and a bottom part, an annular disc valve in which a separable part on an outer circumferential side is separably disposed on the first valve seat of the case member, and a second valve seat provided on a side of the disc valve opposite to the first valve seat, and configured to separably support the disc valve on a radial inner side of the separable part, the second passage includes a piston rod passage part formed by cutting out or penetrating the piston rod, and a chamber passage part which allows communication from the piston rod passage part to a case inner chamber between the bottom part of the case member and the disc valve, the second damping force generation mechanism opens while the first damping force generation mechanism is in a closed state in a region in which a piston speed is low, and both the first damping force generation mechanism and the second damping force generation mechanism open in a region in which the piston speed is higher than in the region in which the piston speed is low.

Advantageous Effects of Invention

According to the shock absorber described above, it is possible to simplify the structure.

DESCRIPTION OF EMBODIMENTS

First Embodiment

A first embodiment according to the present invention will be described with reference to FIGS. 1 to 8. In the following description, for convenience of explanation, an upper side in FIGS. 1 to 3 and 9 to 13 will be referred to as "upper," and a lower side in FIGS. 1 to 3 and 9 to 13 will be referred to as "lower."

Figure 1:
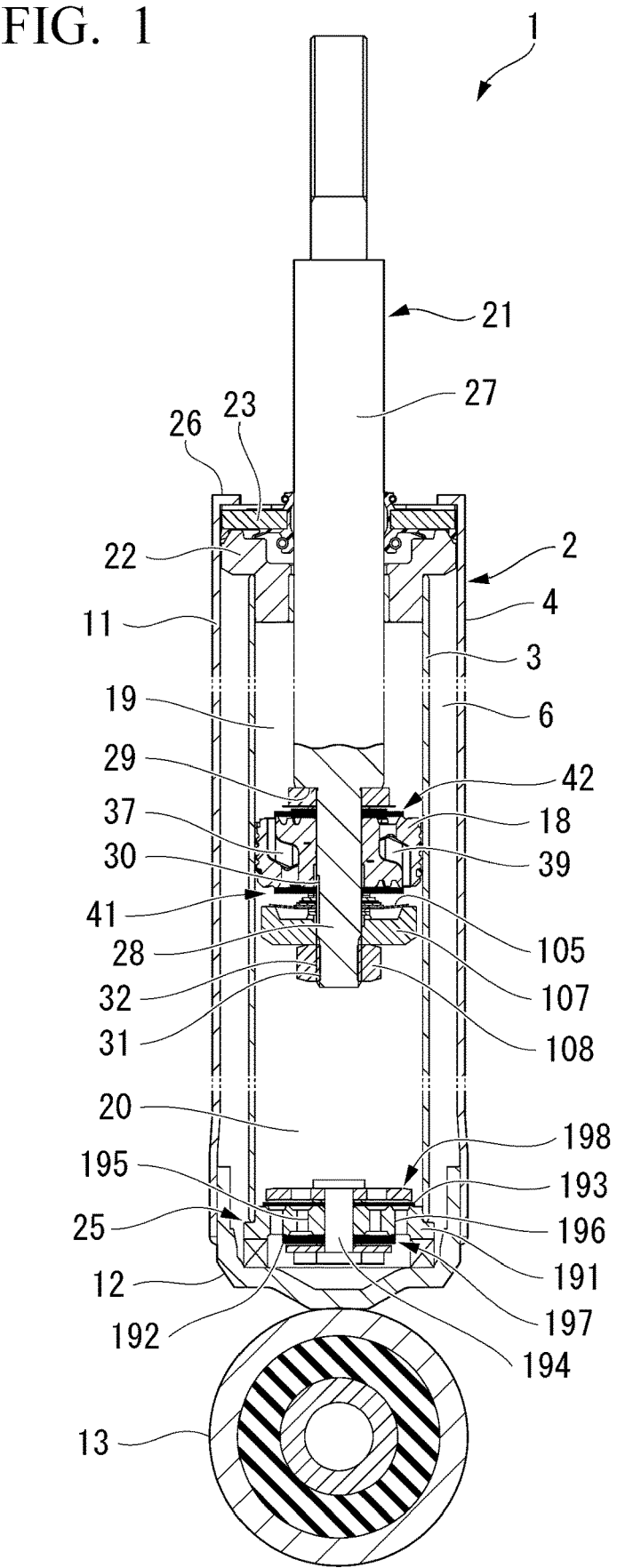
FIG. 1 is a cross-sectional view illustrating a shock absorber of a first embodiment according to the present invention.

As illustrated in FIG. 1, a shock absorber 1 of the first embodiment is a so-called dual-tube type hydraulic shock absorber and includes a cylinder 2 in which an oil fluid (not illustrated) is sealed as a working fluid. The cylinder 2 includes a cylindrical inner tube 3, and a bottomed cylindrical outer tube 4 having a diameter larger than that of the inner tube 3 and concentrically provided to cover the inner tube 3. A reservoir chamber 6 is formed between the inner tube 3 and the outer tube 4.

The outer tube 4 is formed by a cylindrical barrel member 11 and a bottom member 12 fitted to a lower side of the barrel member 11 and fixed by welding to close a lower portion of the barrel member 11. A mounting eye 13 is fixed to the bottom member 12 by welding at a position on an outer side opposite to the barrel member 11.

The shock absorber 1 includes a piston 18 provided to be slidable inside the inner tube 3 of the cylinder 2. The piston 18 defines two chambers in the inner tube 3 including an upper chamber 19 which is one cylinder inner chamber and a lower chamber 20 which is the other cylinder inner chamber. In other words, the piston 18 is slidably provided in the cylinder 2 and partitions the inside of the cylinder 2 into the upper chamber 19 on one side and the lower chamber 20 on the other side. An oil fluid is sealed as a working fluid in the upper chamber 19 and the lower chamber 20 in the inner tube 3. An oil fluid and a gas are sealed as working fluids in the reservoir chamber 6 between the inner tube 3 and outer tube 4.

The shock absorber 1 includes a piston rod 21 in which one end side portion in an axial direction is disposed inside the inner tube 3 of the cylinder 2 to be connected and fixed to the piston 18 and the other end side portion extends to the outside of the cylinder 2. The piston rod 21 penetrates the inside of the upper chamber 19 and does not penetrate the lower chamber 20. Therefore, the upper chamber 19 is a rod side chamber through which the piston rod 21 penetrates, and the lower chamber 20 is a bottom side chamber on a bottom side of the cylinder 2.

The piston 18 and the piston rod 21 move together. The piston 18 moves to the upper chamber 19 side in an extension stroke of the shock absorber 1 in which a protrusion amount of the piston rod 21 from the cylinder 2 increases. The piston 18 moves to the lower chamber 20 side in a compression stroke of the shock absorber 1 in which the protrusion amount of the piston rod 21 from the cylinder 2 decreases.

A rod guide 22 is fitted to an upper end opening side of the inner tube 3 and the outer tube 4, and a seal member 23 is fitted on an upper side of the outer tube 4 which is an outer side of the cylinder 2 with respect to the rod guide 22. The rod guide 22 and the seal member 23 are both annular. The piston rod 21 is slidably inserted into insides of the rod guide 22 and the seal member 23 and extends from the inside of the cylinder 2 to the outside.

The rod guide 22 guides movement of the piston rod 21 by supporting the piston rod 21 to be movable in the axial direction while restricting its movement in a radial direction. The seal member 23 is in close contact with the outer tube 4 at its outer circumferential portion and is in sliding contact with an outer circumferential portion of the piston rod 21 moving in the axial direction at its inner circumferential portion. Thereby, the seal member 23 prevents the oil fluid in the inner tube 3 and the high-pressure gas and the oil fluid of the reservoir chamber 6 in the outer tube 4 from leaking to the outside.

An outer circumferential portion of the rod guide 22 is formed in a stepped shape in which an upper portion has a larger diameter than a lower portion. The outer circumferential portion of the rod guide 22 is fitted to an inner circumferential portion of an upper end of the inner tube 3 at the lower portion of the small diameter and is fitted to an inner circumferential portion of an upper portion of the outer tube 4 at the upper portion of the large diameter. A base valve 25 which defines the lower chamber 20 and the reservoir chamber 6 is installed on the bottom member 12 of the outer tube 4. An inner circumferential portion of a lower end of the inner tube 3 is fitted to the base valve 25. An upper end portion of the outer tube 4 is swaged radially inward to form a locking part 26. The locking part 26 and the rod guide 22 sandwich the seal member 23.

The piston rod 21 includes a main shaft part 27, a mounting shaft part 28 having a diameter smaller than that of the main shaft part 27, and a screw shaft part 31 on a side of the mounting shaft part 28 opposite to the main shaft part 27. The main shaft part 27 of the piston rod 21 is slidably fitted to the rod guide 22 and the seal member 23. The mounting shaft part 28 and the screw shaft part 31 of the piston rod 21 are disposed in the cylinder 2 and connected to the piston 18 or the like. An end portion of the main shaft part 27 on the mounting shaft part 28 side is a shaft step part 29 which extends in a direction perpendicular to the axis.

On an outer circumferential portion of the mounting shaft part 28, a passage notch part 30 extending in the axial direction is formed at an intermediate position in the axial direction. The passage notch part 30 is formed by, for example, cutting out the outer circumferential portion of the mounting shaft part 28 in a planar shape in a plane parallel to a central axis of the mounting shaft part 28. The passage notch part 30 can be formed in a so-called width-across-flat shape formed by cutting out two positions of the mounting shaft part 28 that differ by 180 degrees in a circumferential direction in parallel in a planar shape. Portions of the mounting shaft part 28 other than the passage notch part 30 have a cylindrical surface. The screw shaft part 31 is provided at a distal end position of the piston rod 21 inside the cylinder 2. A male screw 32 is formed on an outer circumferential portion of the screw shaft part 31.

In the shock absorber 1, for example, a protruding portion of the piston rod 21 from the cylinder 2 is disposed at an upper portion and is supported by a vehicle body. In the shock absorber 1, the mounting eye 13 on the cylinder 2 side is disposed at a lower portion and is connected to a wheel side. Conversely, the cylinder 2 side may be supported by a vehicle body, and the piston rod 21 may be connected to a wheel side.

Figure 2:
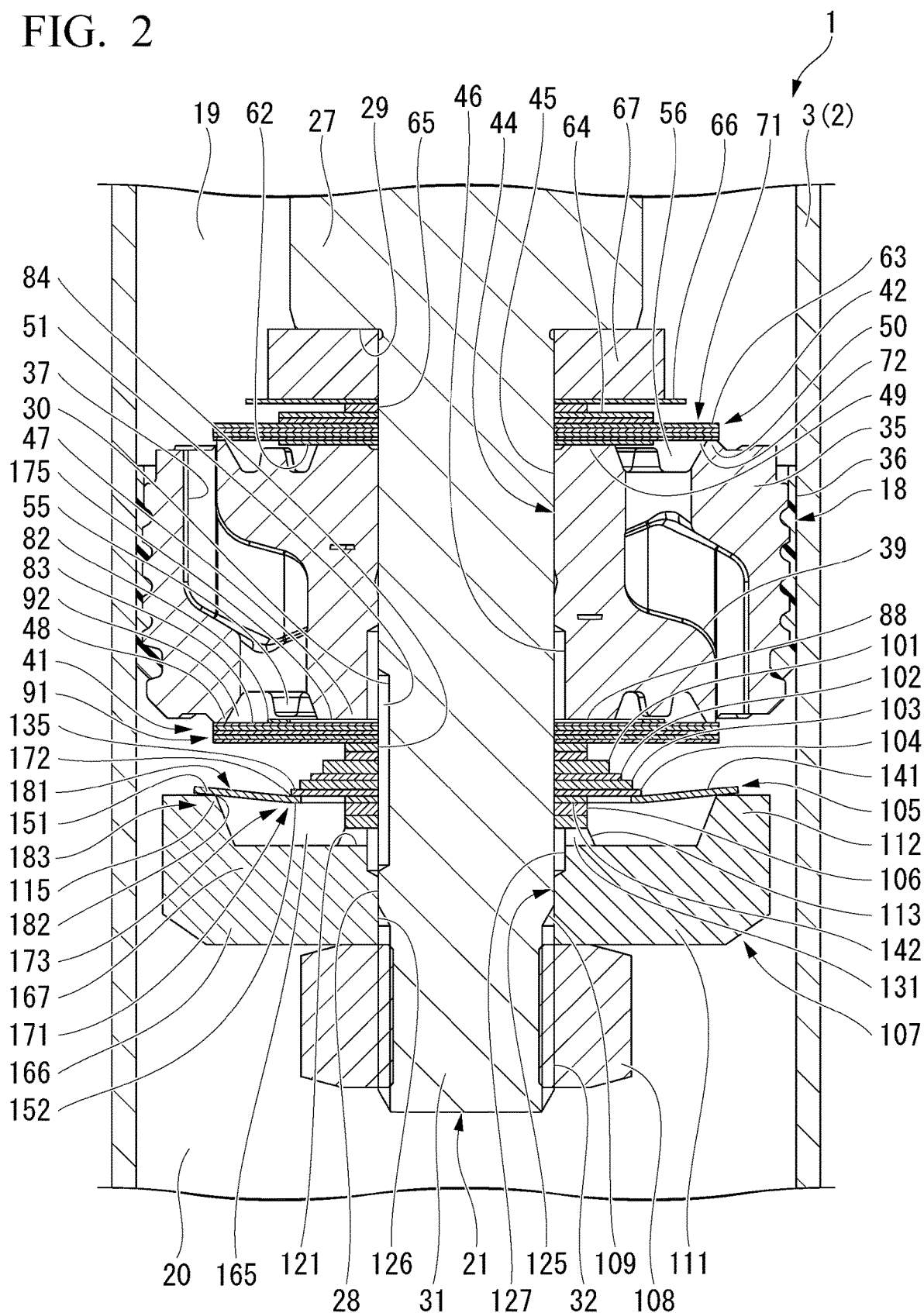
FIG. 2 is a partial cross-sectional view illustrating a main part of the shock absorber of the first embodiment according to the present invention.

As illustrated in FIG. 2, the piston 18 is constituted by a piston main body 35 made of a metal connected to the piston rod 21, and an annular slide member 36 made of a synthetic resin integrally mounted on an outer circumferential surface of the piston main body 35 to slide in the inner tube 3.

The piston main body 35 includes a plurality (only one is illustrated in FIG. 2 because it is a cross section) of passage holes 37 that allow the upper chamber 19 and the lower chamber 20 to communicate with each other, and a plurality (only one is illustrated in FIG. 2 because it is a cross section) of passage holes 39 that allow the upper chamber 19 and the lower chamber 20 to communicate with each other. The piston main body 35 is a sintered product.

The plurality of passage holes 37 are formed at equal pitches with the passage holes 39 interposed therebetween in a circumferential direction of the piston main body 35. The plurality of passage holes 37 constitute one half of the passage holes 37 and 39 in number. The plurality of passage holes 37 have a crank shape having two bending points. The plurality of passage holes 37 on one side (upper side in FIG. 2) of the piston 18 in the axial direction open outward in the radial direction of the piston 18, and those on the other side (lower side in FIG. 2) of the piston 18 in the axial direction open further inward in the radial direction of the piston 18 than those on the one side. An annular groove 55 having an annular shape that allows the plurality of passage holes 37 to communicate with the lower chamber 20 side in the axial direction is formed in the piston main body 35.

A first damping force generation mechanism 41 that opens and closes passages in the annular groove 55 and the plurality of passage holes 37 to generate a damping force is provided on the lower chamber 20 side of the annular groove 55. When the first damping force generation mechanism 41 is disposed on the lower chamber 20 side, passages in the plurality of passage holes 37 and the annular groove 55 serve as extension-side passages through which the oil fluid flows out from the upper chamber 19 on an upstream side to the lower chamber 20 on a downstream side when the piston 18 moves to the upper chamber 19 side, that is, in an extension stroke. The first damping force generation mechanism 41 provided with respect to these passages in the plurality of passage holes 37 and the annular groove 55 serves as an extension-side damping force generation mechanism that generates a damping force by suppressing a flow of the oil fluid from the extension-side passages in the plurality of passage holes 37 and the annular groove 55 to the lower chamber 20.

The passage holes 39 constituting the remaining half of the passage holes 37 and 39 are formed at equal pitches with the passage holes 37 interposed therebetween in the circumferential direction of the piston main body 35.

The plurality of passage holes 39 have a crank shape having two bending points. The plurality of passage holes 39 on the other side (lower side in FIG. 2) of the piston 18 in the axial direction open outward in the radial direction of the piston 18, and those on the one side (upper side in FIG. 2) of the piston 18 in the axial direction open further inward in the radial direction of the piston 18 than those on the other side. An annular groove 56 having an annular shape that allows the plurality of passage holes 39 to communicate with the upper chamber 19 side in the axial direction is formed in the piston main body 35.

A first damping force generation mechanism 42 that opens and closes passages in the plurality of passage holes 39 and the annular groove 56 to generate a damping force is provided on the upper chamber 19 side of the annular groove 56. When the first damping force generation mechanism 42 is disposed on the upper chamber 19 side, the passages in the plurality of passage holes 39 and the annular groove 56 serve as compression-side passages through which the oil fluid flows out from the lower chamber 20 on an upstream side to the upper chamber 19 on a downstream side when the piston 18 moves to the lower chamber 20 side, that is, in a compression stroke. The first damping force generation mechanism 42 provided with respect to these passages in the plurality of passage holes 39 and the annular groove 56 serves as a damping force generation mechanism on the compression side that generates a damping force by suppressing a flow of the oil fluid from the compression-side passages in the plurality of passage holes 39 and the annular groove 56 to the upper chamber 19.

The piston main body 35 has substantially a disc shape. An insertion hole 44 in which the mounting shaft part 28 of the piston rod 21 is inserted is formed to penetrate in the axial direction at a center of the piston main body 35 in the radial direction. The insertion hole 44 includes a small diameter hole portion 45 on one side in the axial direction into which the mounting shaft part 28 of the piston rod 21 is fitted, and a large diameter hole portion 46 on the other side in the axial direction having a larger diameter than the small diameter hole portion 45.

At an end portion of the piston main body 35 on the lower chamber 20 side in the axial direction, an annular inner seat part 47 is formed on a radial inner side of the piston main body 35 with respect to an opening of the annular groove 55 on the lower chamber 20 side. At an end portion of the piston main body 35 on the lower chamber 20 side in the axial direction, an annular valve seat part 48 constituting a part of the first damping force generation mechanism 41 is formed on a radial outer side of the piston main body 35 with respect to the opening of the annular groove 55 on the lower chamber 20 side.

At an end portion of the piston main body 35 on the upper chamber 19 side in the axial direction, an annular inner seat part 49 is formed on a radial inner side of the piston main body 35 with respect to an opening of the annular groove 56 on the upper chamber 19 side. At an end portion of the piston main body 35 on the upper chamber 19 side in the axial direction, an annular valve seat part 50 constituting a part of the first damping force generation mechanism 42 is formed on a radial outer side of the piston main body 35 with respect to the opening of the annular groove 56 on the upper chamber 19 side.

In the insertion hole 44 of the piston main body 35, the large diameter hole portion 46 is provided on the inner seat part 47 side in the axial direction with respect to the small diameter hole portion 45. A passage in the large diameter hole portion 46 of the piston main body 35 constantly communicates with a piston rod passage part 51 in the passage notch part 30 of the piston rod 21 while axial positions thereof overlap each other.

A radial outer side of the piston main body 35 with respect to valve seat part 48 forms a stepped shape whose height in the axial direction is lower than that of the valve seat part 48. The openings of the compression-side passage holes 39 on the lower chamber 20 side are disposed in the stepped shape portion. Similarly, a radial outer side of the piston main body 35 with respect to the valve seat part 50 forms a stepped shape whose height in the axial direction is lower than that of the valve seat part 50. The openings of the extension-side passage holes 37 on the upper chamber 19 side are disposed in the stepped shape portion.

The compression-side first damping force generation mechanism 42 includes the valve seat part 50 of the piston 18. The compression-side first damping force generation mechanism 42 includes one disc 62, a plurality of (specifically, four) discs 63 having the same inner diameter and the same outer diameter, and a plurality of (specifically, two) discs 64 having the same inner diameter and the same outer diameter in that order from the side of the piston 18 in the axial direction. One disc 65, one disc 66, and one annular member 67 are provided at a portion positioned on a side of the discs 64 opposite to the discs 63 in that order from the side of the discs 64. The annular member 67 is in contact with the shaft step part 29 of the piston rod 21. The discs 62 to 66 and the annular member 67 are made of a metal. The discs 62 to 66 and the annular member 67 have a bored disc shape having a certain thickness into which the mounting shaft part 28 of the piston rod 21 can be fitted.

The disc 62 has an outer diameter larger than an outer diameter of the inner seat part 49 of the piston 18 and smaller than an inner diameter of the valve seat part 50. The disc 62 is in constant contact with the inner seat part 49. The plurality of discs 63 have an outer diameter substantially the same as an outer diameter of the valve seat part 50 of the piston 18. The plurality of discs 63 can be seated on the valve seat part 50.

The plurality of discs 64 have an outer diameter smaller than an outer diameter of the discs 63. The disc 65 has an outer diameter smaller than the outer diameter of the discs 64 and smaller than an outer diameter of the inner seat part 49 of the piston 18. The disc 66 has an outer diameter larger than the outer diameter of the discs 64 and smaller than the outer diameter of the discs 63. The annular member 67 has an outer diameter smaller than the outer diameter of the disc 66 and larger than an outer diameter of the shaft step part 29 of the piston rod 21. The annular member 67 has a larger thickness and higher rigidity than the discs 62 to 66.

The plurality of discs 63 and the plurality of discs 64 made of thin metal plates constitute a compression-side main valve 71 that is bendable and able to be separated from and seated on the valve seat part 50. When the main valve 71 is separated from the valve seat part 50, the passages in the annular groove 56 and the plurality of passage holes 39 are caused to communicate with the upper chamber 19, a flow of the oil fluid between the main valve 71 and the valve seat part 50 is suppressed, and thereby a damping force is generated. The annular member 67, together with the disc 66, restricts deformation of the main valve 71 equal to or higher than a specified value in an opening direction.

A passage between the main valve 71 and the valve seat part 50 that appears when the valve opens and the passages in the annular groove 56 and the plurality of passage holes 39 constitute a compression-side first passage 72 through which the oil fluid flows out from the lower chamber 20 on the upstream side to the upper chamber 19 on the downstream side in the cylinder 2 due to the piston 18 moving to the lower chamber 20 side. Therefore, the first passage 72 is formed in the piston 18.

The compression-side first damping force generation mechanism 42 that generates a damping force includes the main valve 71 and the valve seat part 50. Therefore, the compression-side first damping force generation mechanism 42 is provided in the first passage 72. The first passage 72 is formed in the piston 18 including the valve seat part 50, and the oil fluid passes therethrough when the piston rod 21 and the piston 18 move to the compression side.

In the compression-side first damping force generation mechanism 42, a fixed orifice that allows the upper chamber 19 and the lower chamber 20 to communicate with each other is not formed in either of the valve seat part 50 and the main valve 71 in contact with the valve seat part 50 even when they are in contact with each other. That is, the compression-side first damping force generation mechanism 42 does not allow the upper chamber 19 and the lower chamber 20 to communicate with each other when the valve seat part 50 and the main valve 71 are in contact with each other over the entire circumference. In other words, the first passage 72 does not include a fixed orifice formed to allow constant communication between the upper chamber 19 and the lower chamber 20 and is not a passage for allowing constant communication between the upper chamber 19 and the lower chamber 20.

The extension-side first damping force generation mechanism 41 includes the valve seat part 48 of the piston 18. The extension-side first damping force generation mechanism 41 includes one disc 82 and a plurality of (specifically, five) discs 83 having the same inner diameter and the same outer diameter in that order from the side of the piston 18 in the axial direction. A plurality of (specifically, two) discs 84 having the same inner diameter and the same outer diameter are provided on a side of the discs 83 opposite to the disc 82. The discs 82 to 84 are made of a metal and have a bored disc shape having a certain thickness into which the mounting shaft part 28 of the piston rod 21 can be fitted.

Figure 3:
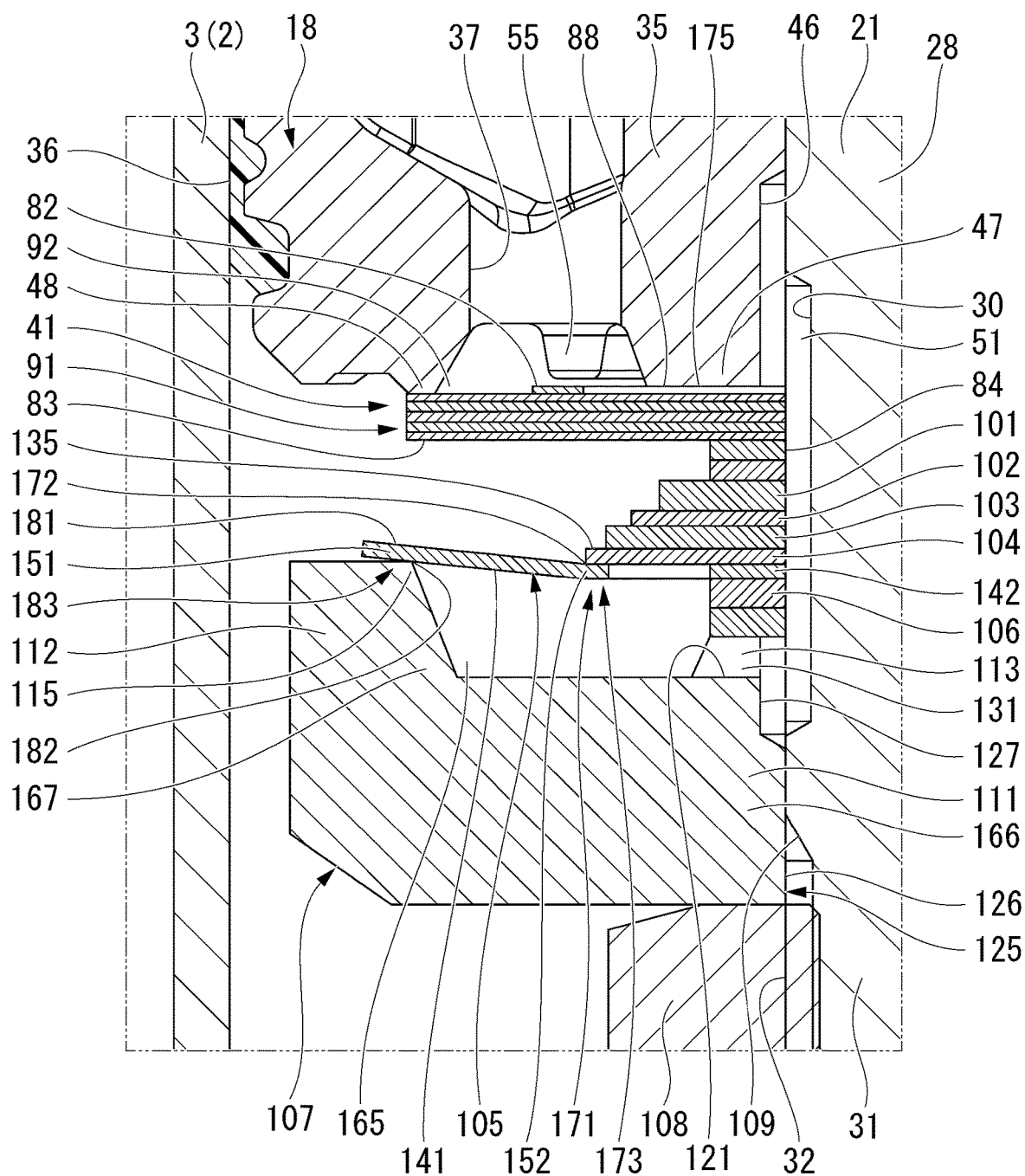
FIG. 3 is a partial cross-sectional view illustrating surroundings of a disc valve of the shock absorber of the first embodiment according to the present invention.

The disc 82 has an outer diameter larger than an outer diameter of the inner seat part 47 of the piston 18 and smaller than an inner diameter of the valve seat part 48. The disc 82 is in constant contact with the inner seat part 47. As illustrated in FIG. 3, a notch part 88 is formed on the disc 82 from an intermediate position on an outer side of the inner seat part 47 in the radial direction to an inner circumferential edge portion. The notch part 88 allows the passages in the annular groove 55 and the plurality of passage holes 37 to constantly communicate with the passage in the large diameter hole portion 46 of the piston 18 and the piston rod passage part 51 in the passage notch part 30 of the piston rod 21. The notch part 88 is formed at the time of press-forming the disc 82.

As illustrated in FIG. 2, the plurality of discs 83 have an outer diameter substantially the same as an outer diameter of the valve seat part 48 of the piston 18. The plurality of discs 83 can be seated on the valve seat part 48. The discs 84 have an outer diameter smaller than the outer diameter of the discs 83 and smaller than the outer diameter of the inner seat part 47 of the piston 18.

The plurality of discs 83 made of thin metal plates constitute an extension-side main valve 91 that is bendable and able to be separated from and seated on the valve seat part 48. When the main valve 91 is separated from the valve seat part 48, the passages in the annular groove 55 and the plurality of passage holes 37 are caused to communicate with the lower chamber 20, a flow of the oil fluid between the main valve 91 and the valve seat part 48 is suppressed, and thereby a damping force is generated.

A passage between the main valve 91 and the valve seat part 48 that appears when the valve opens and the passages in the annular groove 55 and the plurality of passage holes 37 constitute an extension-side first passage 92 through which the oil fluid flows out from the upper chamber 19 on the upstream side to the lower chamber 20 on the downstream side in the cylinder 2 due to the piston 18 moving to the upper chamber 19 side. Therefore, the first passage 92 is formed in the piston 18.

The extension-side first damping force generation mechanism 41 that generates a damping force includes the main valve 91 and the valve seat part 48. Therefore, the extension-side first damping force generation mechanism 41 is provided in the first passage 92. The first passage 92 is provided in the piston 18 including the valve seat part 48, and the oil fluid passes therethrough when the piston rod 21 and the piston 18 move to the extension side.

In the extension-side first damping force generation mechanism 41, a fixed orifice that allows the upper chamber 19 and the lower chamber 20 to communicate with each other is not formed in either of the valve seat part 48 and the main valve 91 in contact with the valve seat part 48 even when they are in contact with each other. That is, the extension-side first damping force generation mechanism 41 does not allow the upper chamber 19 and the lower chamber 20 to communicate with each other when the valve seat part 48 and the main valve 91 are in contact with each other over the entire circumference. In other words, the first passage 92 does not include a fixed orifice formed to allow constant communication between the upper chamber 19 and the lower chamber 20 and is not a passage for allowing constant communication between the upper chamber 19 and the lower chamber 20.

The above-described plurality of discs 84, one disc 101, one disc 102, one disc 103, one disc 104, one disc valve 105, plurality of (specifically, two) discs 106 having the same inner diameter and the same outer diameter, and one case member 107 are provided on a side of the extension-side main valve 91 opposite to the piston 18 in that order from the side of the main valve 91 with the mounting shaft part 28 of the piston rod 21 fitted to inner sides thereof.

The screw shaft part 31 is formed in the piston rod 21 at a portion on a side of the mounting shaft part 28 opposite to the main shaft part 27 and protruding from the case member 107 to a side opposite to the piston 18. A nut 108 is screwed onto the male screw 32 of the screw shaft part 31. The nut 108 is in contact with the case member 107. The screw shaft part 31 includes the male screw 32 which is a complete screw part screwed into the nut 108, and an incomplete screw part 109 at the end portion on the mounting shaft part 28 side. The incomplete screw part 109 is covered by the case member 107.

The discs 101 to 104, the disc valve 105, the discs 106, and the case member 107 are all made of a metal. The discs 101 to 104, the disc valve 105, and the discs 106 all have a bored disc shape having a certain thickness into which the mounting shaft part 28 of the piston rod 21 can be fitted. The case member 107 has an annular shape to which the mounting shaft part 28 of the piston rod 21 can be fitted on an inner side.

The case member 107 is an integrally formed product having a bottomed cylindrical shape. The case member 107 includes a bottom part 111 having a bored disc shape, an annular outer cylindrical part 112 (cylindrical part) protruding from an outer circumferential edge portion of the bottom part 111 to one side in the axial direction of the bottom part 111, and an annular inner cylindrical part 113 protruding from an inner circumferential edge portion of the bottom part 111 to the same side as the outer cylindrical part 112. The outer cylindrical part 112 and the inner cylindrical part 113 are coaxially disposed. The outer cylindrical part 112 has a larger axial length than the inner cylindrical part 113. The case member 107 is disposed in a direction in which the bottom part 111 is positioned on a side opposite to the piston 18 with respect to the outer cylindrical part 112 and the inner cylindrical part 113. The case member 107 is fitted on the mounting shaft part 28 at an inner circumferential portion of the bottom part 111 and covers the incomplete screw part 109.

The outer cylindrical part 112 has an annular shape that is continuous over the entire circumference. The outer cylindrical part 112 has an inner circumferential surface formed in a tapered surface in which a diameter thereof becomes larger with distance away from the bottom part 111 in the axial direction. The outer circumferential surface of the outer cylindrical part 112 forms the same cylindrical surface as the outer circumferential surface of the bottom part 111. A distal end surface of the outer cylindrical part 112 on a side opposite to the bottom part 111 in the axial direction is a plane perpendicular to a central axis of the case member 107.

A corner edge part of the outer cylindrical part 112 on a boundary side of the distal end surface and the inner circumferential surface forms an annular shape. The corner edge part serves as a first valve seat 115 where the disc valve 105 is separated and seated. Therefore, the first valve seat 115 is formed in an annular shape on the outer cylindrical part 112 of the case member 107.

The inner cylindrical part 113 has an outer circumferential surface formed in a tapered surface in which a diameter thereof becomes smaller with distance away from the bottom part 111 in the axial direction. A distal end surface of the inner cylindrical part 113 on a side opposite to the bottom part 111 in the axial direction is a plane perpendicular to the central axis of the case member 107. A plurality of passage grooves 121 that open to the distal end surface and penetrate in the radial direction are formed in the inner cylindrical part 113 at intervals in the circumferential direction. Therefore, the inner cylindrical part 113 does not have a shape that is continuous over the entire circumference but is intermittently formed in the circumferential direction.

At a center in the radial direction of the case member 107, an insertion hole 125 through which the mounting shaft part 28 and the screw shaft part 31 of the piston rod 21 are inserted is formed to penetrate the bottom part 111 and the inner cylindrical part 113 in the axial direction. The insertion hole 125 includes a small diameter hole portion 126 on one side in the axial direction into which the mounting shaft part 28 of the piston rod 21 is fitted and which covers the incomplete screw part 109 of the screw shaft part 31, and a large diameter hole portion 127 on the other side in the axial direction having a larger diameter than the small diameter hole portion 126. The large diameter hole portion 127 is formed to penetrate the inner cylindrical part 113 to the inner cylindrical part 113 side of the bottom part 111 in the axial direction, and the small diameter hole portion 126 is formed on a side of the bottom part 111 opposite to the inner cylindrical part 113 in the axial direction. Therefore, the plurality of passage grooves 121 are all open to the inner circumferential surface of the large diameter hole portion 127.

A passage in the large diameter hole portion 127 is in constant communication with the piston rod passage part 51 in the passage notch part 30 of the piston rod 21 while axial positions thereof overlap each other. A chamber passage part 131 in the passage grooves 121 of the inner cylindrical part 113 is in constant communication with the passage in the large diameter hole portion 127.

The incomplete screw part 109 is disposed within an axial range of the bottom part 111 of the case member 107. The mounting shaft part 28 and the male screw 32 on both sides of the bottom part 111 of the case member 107 in the axial direction are disposed within the axial range of the bottom part 111 of the case member 107. The case member 107 is positioned in the radial direction when the bottom part 111 is fitted on the mounting shaft part 28 in the small diameter hole portion 126.

The disc 101 has an outer diameter larger than the outer diameter of the discs 84 and has a thickness larger than those of the discs 84. The disc 102 has an outer diameter larger than the outer diameter of the disc 101 and has a thickness smaller than that of the disc 101. The disc 103 has an outer diameter larger than the outer diameter of the disc 102 and has a thickness smaller than that of the disc 101 and larger than that of the disc 102. The disc 104 has an outer diameter larger than the outer diameter of the disc 103 and has a thickness smaller than that of the disc 103. Therefore, outer diameters of the discs 101 to 104 become larger as they are positioned closer to the bottom part 111 of the case member 107 in the axial direction.

The outer diameter of the disc 104 is smaller than an inner diameter of the distal end surface of the outer cylindrical part 112 of the case member 107, in other words, an inner diameter of the first valve seat 115. An end surface of the disc 104 on the bottom part 111 side is disposed on the bottom part 111 side in the axial direction with respect to the distal end surface of the outer cylindrical part 112 of the case member 107, in other words, a distal end surface of the first valve seat 115 on a side opposite to the bottom part 111.

The disc valve 105 is separated from and seated on an annular outer circumferential portion of the disc 104 on the case member 107 side in the axial direction. The disc 104, together with the discs 101 to 103 stacked on the disc 104, constitutes a second valve seat 135 where the disc valve 105 is separated and seated. In other words, the second valve seat 135 supports the disc valve 105 when it is seated. The second valve seat 135 including the discs 101 to 104 allows the piston rod 21 to be inserted through a radial inner side thereof.

The second valve seat 135 is disposed to be spaced apart on a radial inner side with respect to the first valve seat 115 of the case member 107 and is positioned on the bottom part 111 side in the axial direction. Outer diameters of the discs 101 to 104 become smaller with distance away from the case member 107 in the axial direction. Since the discs 101 to 104 are made of thin metal plates, the second valve seat 135 including the discs 101 to 104 has a bendable configuration. On the other hand, the first valve seat 115 of the case member 107 has high rigidity compared to the second valve seat 135 and basically does not bend. The second valve seat 135 can adjust support rigidity of the disc valve 105 by changing a thickness and an outer diameter of each of the discs 101 to 104, the number thereof, or the like.

The discs 106 have an outer diameter smaller than the outer diameter of the disc 104. The discs 106 have an outer diameter the same as the outer diameter of the discs 84. The discs 106 have the same outer diameter as an outer diameter of the distal end surface on a side of the inner cylindrical part 113 of the case member 107 opposite to the bottom part 111.

Figure 4:
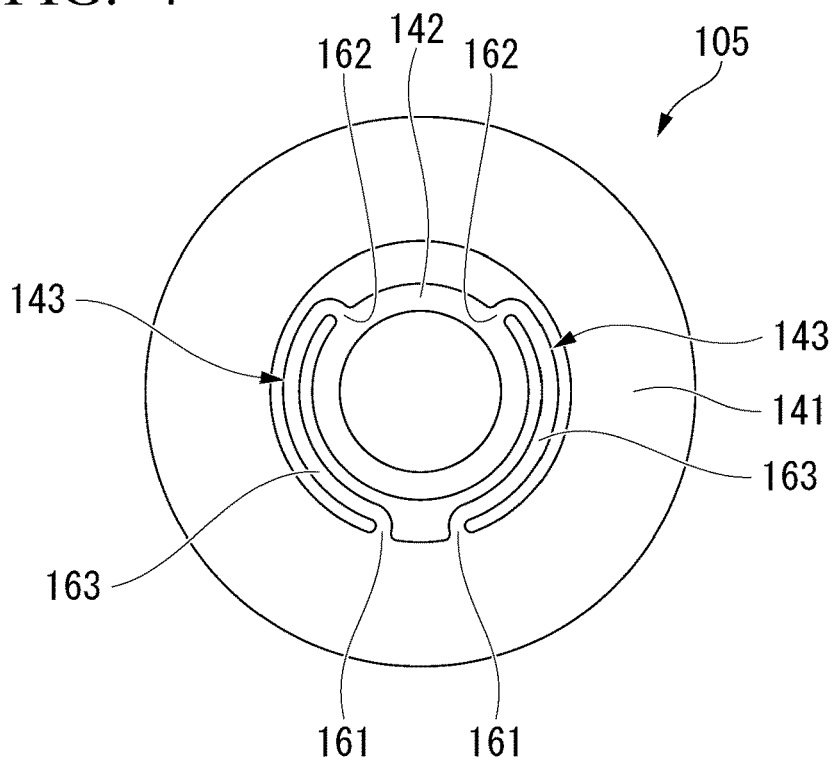
FIG. 4 is a plan view illustrating the disc valve of the shock absorber of the first embodiment according to the present invention.

The disc valve 105 is made of a thin metal plate and is bendable. The disc valve 105 has a flat plate shape as a whole in a natural state before being incorporated into the shock absorber 1. As illustrated in FIG. 4, the disc valve 105 in the natural state includes a bored disc-shaped outer annular part 141, a bored disc-shaped inner annular part 142 having an outer diameter smaller than an inner diameter of the outer annular part 141 and disposed on a radial inner side of the outer annular part 141, and a plurality of, specifically two, support parts 143 connecting the outer annular part 141 and the inner annular part 142. There is a space between the outer annular part 141 and the inner annular part 142 except for the two support parts 143. The disc valve 105 has a mirror-symmetrical shape.

The outer annular part 141 has an outer circumferential surface and an inner circumferential surface that are both circular and concentrically disposed, in other words, has an annular shape having a constant radial width. The inner annular part 142 also has an outer circumferential surface and an inner circumferential surface that are both circular and concentrically disposed, in other words, has an annular shape having a constant radial width. The two support parts 143 are disposed between the inner annular part 142 and the outer annular part 141. The two support parts 143 support the outer annular part 141 concentrically with the inner annular part 142.

As illustrated in FIG. 3, the inner annular part 142 allows the mounting shaft part 28 of the piston rod 21 to be inserted through an inner side thereof. The inner annular part 142 has an inner diameter that can be fitted on the mounting shaft part 28 of the piston rod 21, and an outer diameter that is smaller than the outer diameter of the disc 104, that is, the outer diameter of the second valve seat 135. The outer diameter of the inner annular part 142 is the same as the outer diameter of the distal end surface of the inner cylindrical part 113 of the case member 107 and the outer diameter of the discs 106. Therefore, the inner annular part 142 of the disc valve 105, together with the discs 101 to 104, is clamped in the axial direction by the discs 84 and the discs 106.

The inner diameter of the outer annular part 141 is smaller than the outer diameter of the disc 104, that is, the outer diameter of the second valve seat 135. The outer diameter of the outer annular part 141 is larger than the inner diameter of the distal end surface of the outer cylindrical part 112 of the case member 107, that is, a diameter of the first valve seat 115. The outer diameter of the outer annular part 141, that is, the outer diameter of the disc valve 105, is larger than an outer diameter of the main valve 91.

The outer annular part 141 is configured such that an outer circumferential side separable part 151 (separable part) on an outer circumferential side thereof is separably in contact with the first valve seat 115 of the case member 107. The outer annular part 141 closes a gap between itself and the first valve seat 115 when the outer circumferential side separable part 151 is seated on the first valve seat 115 over the entire circumference. The outer annular part 141 opens the gap between itself and the first valve seat 115 when the outer circumferential side separable part 151 is separated from the first valve seat 115.

The outer annular part 141 is configured such that an inner circumferential side separable part 152 on an inner circumferential side thereof is separably in contact with the second valve seat 135 of the disc 104. The outer annular part 141 closes a gap between itself and the second valve seat 135 when the inner circumferential side separable part 152 is seated on the second valve seat 135 over the entire circumference. The outer annular part 141 opens the gap between itself and the second valve seat 135 when the inner circumferential side separable part 152 is separated from the second valve seat 135. When the outer annular part 141 is seated on the second valve seat 135, the disc 104 closes a gap between the outer annular part 141 and the inner annular part 142 of the disc valve 105.

Therefore, in the disc valve 105, the outer circumferential side separable part 151 on the outer circumferential side is separably disposed on the first valve seat 115 of the case member 107. The second valve seat 135 is provided on a side of the disc valve 105 opposite to the first valve seat 115 in the axial direction and separably supports the inner circumferential side separable part 152 of the disc valve 105 on a radial inner side of the outer circumferential side separable part 151.

As illustrated in FIG. 4, the two support parts 143 include two outer connecting parts 161, two inner connecting parts 162, and two connecting arm parts 163.

The two outer connecting parts 161 are disposed on the same one side with respect to a center in the radial direction of the disc valve 105 at a distance in the circumferential direction of the disc valve 105 and are connected to the outer annular part 141. The two outer connecting parts 161 both protrude to a radially inner side of the outer annular part 141 from an inner circumferential edge portion of the outer annular part 141.

The two inner connecting parts 162 are disposed on the same opposite side with respect to the center, that is, on a side opposite to the two outer connecting parts 161 in the radial direction of the disc valve 105 at a distance in the circumferential direction of the disc valve 105 and are connected to the inner annular part 142. The two inner connecting parts 162 both protrude to a radially outer side of the inner annular part 142 from an outer circumferential edge portion of the inner annular part 142.

A distance between the two inner connecting parts 162 is larger than a distance between the two outer connecting parts 161. A straight line connecting the two inner connecting parts 162 and a straight line connecting the two outer connecting parts 161 are parallel to each other. Therefore, a straight line connecting a midpoint of the straight line connecting the two inner connecting parts 162 and a midpoint of the straight line connecting the two outer connecting parts 161 passes through the center of the inner annular part 142 and the outer annular part 141, that is, the center of the disc valve 105. A distance between the outer connecting part 161 and the inner connecting part 162 that are close to each other in the circumferential direction of the disc valve 105 on one side is the same as a distance between the outer connecting part 161 and the inner connecting part 162 that are close to each other in the circumferential direction of the disc valve 105 on the other side. This distance is larger than the distance connecting the two inner connecting parts 162 and larger than the distance connecting the two outer connecting parts 161.

The two connecting arm parts 163 are provided to connect the outer connecting parts 161 and the inner connecting parts 162 which are close to each other in the circumferential direction of the disc valve 105. That is, the connecting arm part 163 on one side connects one outer connecting part 161 and one inner connecting part 162 that are close in the circumferential direction of the disc valve 105 on one side. These outer connecting part 161 and inner connecting part 162 constitute one support part 143. The connecting arm part 163 on the other side connects the other outer connecting part 161 and the other inner connecting part 162 that are close in the circumferential direction of the disc valve 105 on the other side. These outer connecting part 161 and inner connecting part 162 form the other support part 143.

The two connecting arm parts 163 extend in an arc shape along an inner circumferential surface of the outer annular part 141 and an outer circumferential surface of the inner annular part 142 and are disposed on the same circle concentric with the outer annular part 141 and the inner annular part 142. The two connecting arm parts 163 have a radial distance from the inner circumferential surface of the outer annular part 141 that is the same as a radial distance from the outer circumferential surface of the inner annular part 142.

As illustrated in FIG. 3, when the outer annular part 141 of the disc valve 105 is seated on the second valve seat 135 at the inner circumferential side separable part 152 on the inner circumferential side, the disc 104 constituting the second valve seat 135 shuts off a space between the outer annular part 141 and the inner annular part 142 of the disc valve 105. In other words, the second valve seat 135 is provided to be able to shut off the space between the outer annular part 141 and the inner annular part 142 of the disc valve 105.

The disc valve 105, the plurality of discs 106, and the case member 107 form a case inner chamber 165 therein. In the case member 107, a predetermined range of the bottom part 111 on a side opposite to the outer cylindrical part 112 and the inner cylindrical part 113 in the axial direction covers the incomplete screw part 109 of the piston rod 21. The above-described range in the case member 107 is a washer part 166. In the case member 107, the outer cylindrical part 112, the inner cylindrical part 113, and a predetermined range of the bottom part 111 on a side of the outer cylindrical part 112 and the inner cylindrical part 113 in the axial direction are a case part 167 that forms the chamber passage part 131 and the case inner chamber 165. In other words, the case member 107 is integrally formed to include the case part 167 forming the chamber passage part 131 and the case inner chamber 165, and the washer part 166 covering the incomplete screw part 109 of the piston rod 21.

The incomplete screw part 109 is disposed within an axial range of the washer part 166. The mounting shaft part 28 and the male screw 32 on both sides of the washer part 166 in the axial direction are disposed within the axial range of the washer part 166. The case member 107 is positioned in the radial direction when the washer part 166 is fitted on the mounting shaft part 28. When the incomplete screw part 109 is covered by the washer part 166, the discs 106 or the like can be properly fitted on the mounting shaft part 28 while axial positions thereof completely overlap each other. The nut 108 can be properly screwed onto the male screw 32, which is a complete screw part, while axial positions thereof completely overlap each other. The washer part 166 also serves the role of stabilizing and balancing a fastening axial force of the nut 108.

The case inner chamber 165 constantly communicates with the passage in the large diameter hole portion 127 and the piston rod passage part 51 in the passage notch part 30 via the chamber passage part 131 in the passage grooves 121 of the inner cylindrical part 113. In other words, the chamber passage part 131 allows communication from the piston rod passage part 51 to the case inner chamber 165 between the bottom part 111 and the disc valve 105. Therefore, the case inner chamber 165 constantly communicates with the upper chamber 19 via the chamber passage part 131 in the passage grooves 121, the passage in the large diameter hole portion 127 of the case member 107, the piston rod passage part 51 in the passage notch part 30 of the piston rod 21, the passage in the large diameter hole portion 46 of the piston 18, the passage in the notch part 88 of the disc 82, and the passages in the annular groove 55 and the plurality of passage holes 37 of the piston 18 as illustrated in FIG. 2.

The inner circumferential side of the disc valve 105 including the inner circumferential side separable part 152 of the outer annular part 141 constitutes a sub-valve 171 that can be separated from and seated on the second valve seat 135. The sub-valve 171 is provided on the lower chamber 20 side between the upper chamber 19 and the lower chamber 20. The sub-valve 171 is provided on the case inner chamber 165 side between the lower chamber 20 and the case inner chamber 165.

When the sub-valve 171 is separated from the second valve seat 135, the lower chamber 20 and the case inner chamber 165 are allowed to communicate with each other via a gap between the sub-valve 171 and the second valve seat 135 and a passage between the outer annular part 141 and the inner annular part 142 of the disc valve 105. Therefore, the sub-valve 171 allows the lower chamber 20 to communicate with the upper chamber 19. At this time, the sub-valve 171 suppresses a flow of the oil fluid between the sub-valve 171 and the second valve seat 135 to generate a damping force. The sub-valve 171 is an inflow valve that opens when the oil fluid is caused to flow into the case inner chamber 165 from the lower chamber 20 via the gap between the sub-valve 171 and the second valve seat 135. The sub-valve 171 is a check valve that restricts an outflow of the oil fluid from the case inner chamber 165 to the lower chamber 20 via the gap between the sub-valve 171 and the second valve seat 135.

The passage between the sub-valve 171 and the second valve seat 135 that appears when the valve opens, the passage between the outer annular part 141 and the inner annular part 142 of the disc valve 105, the case inner chamber 165, the chamber passage part 131 in the passage grooves 121 and the passage in the large diameter hole portion 127 of the case member 107, the piston rod passage part 51 in the passage notch part 30 of the piston rod 21, the passage in the large diameter hole portion 46 of the piston 18, the passage in the notch part 88 of the disc 82, and the passages in the annular groove 55 and the plurality of passage holes 37 constitute a second passage 172 through which the oil fluid flows out from the lower chamber 20 on the upstream side to the upper chamber 19 on the downstream side in the cylinder 2 due to the piston 18 moving to the lower chamber 20 side. The second passage 172 is a compression-side passage through which the oil fluid flows out from the lower chamber 20 on the upstream side toward the upper chamber 19 on the downstream side when the piston 18 moves to the lower chamber 20 side, that is, in the compression stroke.

The second passage 172 includes the piston rod passage part 51 in the passage notch part 30 formed by cutting out the piston rod 21. In other words, a part of the second passage 172 is formed by cutting out the piston rod 21. In addition to forming the piston rod passage part 51 by cutting out the piston rod 21, the piston rod passage part 51 may be formed by penetrating the inside of the piston rod 21 in a hole shape so that one end opens to the passage in the large diameter hole portion 127 of the case member 107 and the other end opens to the passage in the large diameter hole portion 46 of the piston 18. Therefore, the second passage 172 includes the piston rod passage part 51 formed by cutting out or penetrating the piston rod 21 and the chamber passage part 131 that allows communication from the piston rod passage part 51 to the case inner chamber 165 between the bottom part 111 of the case member 107 and the disc valve 105.

The sub-valve 171 and the second valve seat 135 are provided in the second passage 172 on the compression side. Thereby, a compression-side second damping force generation mechanism 173 that opens and closes the second passage 172 and suppresses a flow of the oil fluid from the second passage 172 to the upper chamber 19 to generate a damping force is constituted. The sub-valve 171 constituting the compression-side second damping force generation mechanism 173 is a sub-valve on the compression side. The second damping force generation mechanism 173 including the sub-valve 171 and the second valve seat 135 allows the piston rod 21 to be inserted through a radial inner side thereof. The second damping force generation mechanism 173 is disposed on the lower chamber 20 side between the two chambers, that is, the upper chamber 19 and the lower chamber 20.

In the second passage 172, when the second damping force generation mechanism 173 is in an open state, the passage in the notch part 88 of the disc 82 illustrated in FIG. 3 becomes the narrowest in portions having a fixed flow path cross-sectional area and is narrowed more than the front and rear thereof. Thereby, the passage in the notch part 88 of the disc 82 serves as an orifice 175 in the second passage 172. The orifice 175 is disposed downstream of the sub-valve 171 in a flow of the oil fluid when the sub-valve 171 opens and the oil fluid flows in the second passage 172. In other words, as illustrated in FIG. 2, the orifice 175 is disposed on the upper chamber 19 side with respect to the sub-valve 171 in the second passage 172.

In the compression-side second damping force generation mechanism 173, a fixed orifice that allows the upper chamber 19 and the lower chamber 20 to communicate with each other is not formed in any of the second valve seat 135 and the sub-valve 171 in contact with the second valve seat 135 even when they are in contact with each other. That is, the compression-side second damping force generation mechanism 173 does not allow the upper chamber 19 and the lower chamber 20 to communicate with each other when the second valve seat 135 is in contact with the sub-valve 171 over the entire circumference. In other words, the second passage 172 does not include a fixed orifice formed to allow constant communication between the upper chamber 19 and the lower chamber 20 and is not a passage that allows constant communication between the upper chamber 19 and the lower chamber 20.

The compression-side second passage 172 that allows the upper chamber 19 and the lower chamber 20 to communicate with each other is in parallel with the first passage 72 that is also a compression-side passage allowing the upper chamber 19 and the lower chamber 20 to communicate with each other. The first damping force generation mechanism 42 is provided in the first passage 72, and the second damping force generation mechanism 173 is provided in the second passage 172. Therefore, the first damping force generation mechanism 42 and the second damping force generation mechanism 173, which are both on the compression side, are disposed in parallel.

The outer circumferential side of the disc valve 105 including the outer circumferential side separable part 151 of the outer annular part 141 constitutes a sub-valve 181 that can be separated from and seated on the first valve seat 115. The sub-valve 181 is provided on the lower chamber 20 side between the upper chamber 19 and the lower chamber 20. The sub-valve 181 is provided on the lower chamber 20 side between the lower chamber 20 and the case inner chamber 165.

When the sub-valve 181 is separated from the first valve seat 115, the case inner chamber 165 and the lower chamber 20 are allowed to communicate with each other via a gap between the sub-valve 181 and the first valve seat 115, and thereby the upper chamber 19 is allowed to communicate with the lower chamber 20. At this time, the sub-valve 181 suppresses a flow of the oil fluid between the sub-valve 181 and the first valve seat 115 to generate a damping force. The sub-valve 181 is a discharge valve that opens when the oil fluid is discharged from the inside of the case inner chamber 165 to the lower chamber 20 via the gap between the sub-valve 181 and the first valve seat 115. The sub-valve 181 is a check valve that restricts an inflow of the oil fluid from the lower chamber 20 into the case inner chamber 165 via the gap between the sub-valve 181 and the first valve seat 115.

The passages in the plurality of passage holes 37 and the annular groove 55 of the piston 18, the passage in the notch part 88 of the disc 82, the passage in the large diameter hole portion 46 of the piston 18, the piston rod passage part 51 in the passage notch part 30 of the piston rod 21, the passage in the large diameter hole portion 127 and the chamber passage part 131 in the passage grooves 121 of the case member 107, the case inner chamber 165, and the passage between the sub-valve 181 and the first valve seat 115 that appears when the valve opens constitute a second passage 182 through which the oil fluid flows out from the upper chamber 19 on the upstream side to the lower chamber 20 on the downstream side in the cylinder 2 due to the piston 18 moving to the upper chamber 19 side. The second passage 182 is a passage on the extension side through which the oil fluid flows out from the upper chamber 19 on the upstream side toward the lower chamber 20 on the downstream side when the piston 18 moves to the upper chamber 19 side, that is, in the extension stroke.

The second passage 182 includes the piston rod passage part 51 in the passage notch part 30 formed by cutting out the piston rod 21. In other words, a part of the second passage 182 is formed by cutting out the piston rod 21. In addition to forming the piston rod passage part 51 by cutting out the piston rod 21, as described above, the piston rod passage part 51 may be formed by penetrating the inside of the piston rod 21 in a hole shape. Therefore, the second passage 182 includes the piston rod passage part 51 formed by cutting out or penetrating the piston rod 21 and the chamber passage part 131 that allows communication from the piston rod passage part 51 to the case inner chamber 165 between the bottom part 111 of the case member 107 and the disc valve 105.

The sub-valve 181 and the annular first valve seat 115 formed on the outer cylindrical part 112 of the case member 107 are provided in the second passage 182 on the extension side. Thereby, an extension-side second damping force generation mechanism 183 that opens and closes the second passage 182 and suppresses a flow of the oil fluid from the second passage 182 to the lower chamber 20 to generate a damping force is constituted. In other words, in the second damping force generation mechanism 183, the first valve seat 115 is provided on the case member 107. The sub-valve 181 constituting the extension-side second damping force generation mechanism 183 is a sub-valve on the extension side. The second damping force generation mechanism 183 including the sub-valve 181 and the first valve seat 115 allows the piston rod 21 to be inserted through a radial inner side thereof and is disposed on the lower chamber 20 side between the two chambers, that is, the upper chambers 19 and the lower chamber 20.

In the second passage 182, when the second damping force generation mechanism 183 is in an open state, the passage in the notch part 88 of the disc 82 illustrated in FIG. 3 becomes the narrowest in portions having a fixed flow path cross-sectional area and is narrowed more than the front and rear thereof. The passage in the notch part 88 of the disc 82 is the orifice 175 also in the second passage 182. The orifice 175 is common to the second passages 172 and 182. The orifice 175 is disposed upstream of the sub-valve 181 in a flow of the oil fluid when the sub-valve 181 opens and the oil fluid flows in the second passage 182. In other words, as illustrated in HG. 2, the orifice 175 is disposed on the upper chamber 19 side with respect to the sub-valve 181 in the second passage 182. The orifice 175 is formed by cutting out the disc 82 that comes into contact with the piston 18 among the parts constituting the first damping force generation mechanism 41.

In the extension-side second damping force generation mechanism 183, a fixed orifice that allows the upper chamber 19 and the lower chamber 20 to communicate with each other is not formed in either of the first valve seat 115 and the sub-valve 181 in contact with the first valve seat 115 even when they are in contact with each other. That is, the extension-side second damping force generation mechanism 183 does not allow the upper chamber 19 and the lower chamber 20 to communicate with each other when the first valve seat 115 and the sub-valve 181 are in contact with each other over the entire circumference. In other words, the second passage 182 does not include a fixed orifice formed to allow constant communication between the upper chamber 19 and the lower chamber 20. The second passage 182 is not a passage that allows constant communication between the upper chamber 19 and the lower chamber 20.

In the shock absorber 1, at least as a flow of causing the oil fluid to pass in the piston 18 in the axial direction, the upper chamber 19 and the lower chamber 20 can communicate with each other only via the first damping force generation mechanisms 41 and 42 and the second damping force generation mechanisms 173 and 183. Therefore, in the shock absorber 1, a fixed orifice that allows constant communication between the upper chamber 19 and the lower chamber 20 is not provided at least on the passage of the oil fluid that passes in the piston 18 in the axial direction.

The extension-side second passage 182 that allows the upper chamber 19 and the lower chamber 20 to communicate with each other is parallel to the first passage 92 that is also an extension-side passage allowing the upper chamber 19 and the lower chamber 20 to communicate with each other except for the passages in the plurality of passage holes 37 and the annular groove 55 on the upper chamber 19 side. In this parallel portion, the first damping force generation mechanism 41 is provided in the first passage 92, and the second damping force generation mechanism 183 is provided in the second passage 182. Therefore, the first damping force generation mechanism 41 and the second damping force generation mechanism 183, which are both on the extension side, are disposed in parallel.

As described above, the second damping force generation mechanisms 173 and 183 include the annular first valve seat 115 formed on the outer cylindrical part 112 of the bottomed cylindrical case member 107 having the bottom part 111, the outer cylindrical part 112, and the inner cylindrical part 113, the annular disc valve 105 in which the outer circumferential side separable part 151 on the outer circumferential side is separably disposed on the first valve seat 115 of the case member 107, and the second valve seat 135 provided on a side of the disc valve 105 opposite to the first valve seat 115 and configured to separably support the inner circumferential side separable part 152 of the disc valve 105 on a radial inner side of the outer circumferential side separable part 151. The second damping force generation mechanism 173 is provided at a position of an end portion of the second passage 172. The second damping force generation mechanism 183 is provided at a position of an end portion of the second passage 182.

As illustrated in FIG. 1, the base valve 25 described above is provided between the bottom member 12 of the outer tube 4 and the inner tube 3. The base valve 25 includes a base valve member 191 which partitions the lower chamber 20 and the reservoir chamber 6, a disc 192 provided on a lower side of the base valve member 191, that is, on the reservoir chamber 6 side, a disc 193 provided on an upper side of the base valve member 191, that is, on the lower chamber 20 side, and an attachment pin 194 which attaches the disc 192 and the disc 193 to the base valve member 191.

The base valve member 191 has an annular shape, and the attachment pin 194 is inserted through a center thereof in the radial direction. A plurality of passage holes 195 through which the oil fluid can flow between the lower chamber 20 and the reservoir chamber 6, and a plurality of passage holes 196 through which the oil fluid can flow between the lower chamber 20 and the reservoir chamber 6 on an outer side of the base valve member 191 in the radial direction with respect to the passage holes 195 are formed in the base valve member 191. The disc 192 on the reservoir chamber 6 side restricts a flow of the oil fluid from the reservoir chamber 6 to the lower chamber 20 through the passage holes 195 while allowing a flow of the oil fluid from the lower chamber 20 to the reservoir chamber 6 through the passage holes 195. The disc 193 restricts a flow of the oil fluid from the lower chamber 20 to the reservoir chamber 6 through the passage holes 196 while allowing a flow of the oil fluid from the reservoir chamber 6 to the lower chamber 20 through the passage holes 196.

The disc 192, with the base valve member 191, constitutes a compression-side damping valve mechanism 197 which opens in the compression stroke of the shock absorber 1 to cause the oil fluid to flow from the lower chamber 20 to the reservoir chamber 6 and generate a damping force. The disc 193, with the base valve member 191, constitutes a suction valve mechanism 198 which opens in the extension stroke of the shock absorber 1 to cause the oil fluid to flow from the reservoir chamber 6 into the lower chamber 20. Further, the suction valve mechanism 198 performs a function of causing the oil fluid to flow from the reservoir chamber 6 to the lower chamber 20 substantially without generating a damping force so that a shortage of the oil fluid caused mainly by extension of the piston rod 21 from the cylinder 2 is supplemented.

As illustrated in FIG. 2, when the piston 18 and the like are assembled to the piston rod 21, the annular member 67, the disc 66, the disc 65, the plurality of discs 64, the plurality of discs 63, the discs 62, and the piston 18 are stacked in that order on the shaft step part 29 while the screw shaft part 31 and the mounting shaft part 28 of the piston rod 21 are inserted therethrough. At this time, the piston 18 is directed so that the small diameter hole portion 45 is positioned on the shaft step part 29 side with respect to the large diameter hole portion 46. In addition, the disc 82, the plurality of discs 83, the plurality of discs 84, the disc 101, the disc 102, the disc 103, the disc 104, the disc valve 105, the plurality of discs 106, and the case member 107 are stacked in that order on the piston 18 while the screw shaft part 31 and the mounting shaft part 28 are inserted therethrough. At this time, the case member 107 is directed so that the outer cylindrical part 112 and the inner cylindrical part 113 are positioned on the piston 18 side with respect to the bottom part 111. The case member 107 comes into contact with the disc 106 at the inner cylindrical part 113 and comes into contact with the outer annular part 141 of the disc valve 105 at the outer cylindrical part 112.

In this state, the nut 108 is screwed onto the male screw 32 of the screw shaft part 31 of the piston rod 21 protruding further than the case member 107 so that inner circumferential sides of the nut 108 and the shaft step part 29 are clamped together in the axial direction.

In this state, an inner circumferential side of the main valve 71 is clamped by the inner seat part 49 of the piston 18 and the disc 65 via the disc 62. At the same time, the main valve 71 comes into contact with the valve seat part 50 of the piston 18 over the entire circumference. In this state, the inner circumferential side of the main valve 91 is clamped by the inner seat part 47 of the piston 18 and the disc 84 via the disc 82. The main valve 91 comes into contact with the valve seat part 48 of the piston 18 over the entire circumference.

In this state, the discs 101 to 104 constituting the second valve seat 135 and the disc valve 105 are clamped by the disc 84 and the disc 106 on the inner circumferential side.

At this time, the disc valve 105 is clamped at the inner annular part 142. The support parts 143 and the outer annular part 141 illustrated in FIG. 4 are not clamped. At the same time, as illustrated in FIG. 2, the sub-valve 171 of the outer annular part 141 of the disc valve 105 comes into contact with the second valve seat 135 by the inner circumferential side separable part 152 from a side opposite to the piston 18 over the entire circumference. The sub-valve 181 of the outer annular part 141 comes into contact with the first valve seat 115 by the outer circumferential side separable part 151 from the piston 18 side over the entire circumference.

As described above, the second valve seat 135 is positioned on the bottom part 111 side with respect to the first valve seat 115 in the axial direction, that is, on a side opposite to the piston 18. Therefore, the outer annular part 141 that comes into contact with the first valve seat 115 and the second valve seat 135 at the same time is deformed in a tapered shape such that it becomes further away from the piston 18 in the axial direction toward the inner side in the radial direction. In other words, the outer annular part 141 is deformed in a tapered shape so that the outer circumferential side separable part 151 on the first valve seat 115 side is positioned on the piston 18 side in the axial direction with respect to the inner circumferential side separable part 152 on the second valve seat 135 side.

Of the first damping force generation mechanism 41 and the second damping force generation mechanism 183 which are both on the extension side, the main valve 91 of the first damping force generation mechanism 41 is constituted by stacking a plurality of discs 83. Therefore, rigidity and a valve opening pressure are higher than those of the sub-valve 181 of the second damping force generation mechanism 183 formed by one disc valve 105. Therefore, in the extension stroke, the second damping force generation mechanism 183 opens while the first damping force generation mechanism 41 is in a closed state in an extremely low speed region in which a piston speed is lower than a predetermined value. Also, in a normal speed region in which the piston speed is equal to or higher than the predetermined value, both the first damping force generation mechanism 41 and the second damping force generation mechanism 183 are opened. The sub-valve 181 is an extremely low speed valve that opens in a region in which the piston speed is extremely low to generate a damping force.

That is, in the extension stroke, a pressure of the upper chamber 19 increases and a pressure of the lower chamber 20 decreases as the piston 18 moves to the upper chamber 19 side. However, since none of the first damping force generation mechanisms 41 and 42 and the second damping force generation mechanisms 173 and 183 has a fixed orifice, the oil fluid does not flow until the second damping force generation mechanism 183 is opened. Therefore, the damping force rises sharply at a piston speed less than a first predetermined value v1 in the extension stroke. When the piston speed is in a region having a higher speed than the first predetermined value v1 in which the second damping force generation mechanisms 183 opens and in an extremely low speed region (v1 or more and less than v2) having a lower speed than a second predetermined value v2 that is higher speed than the first predetermined value v1, the second damping force generation mechanism 183 opens while the first damping force generation mechanism 41 is in a closed state.

That is, the sub-valve 181 is separated from the first valve seat 115 to allow the upper chamber 19 and the lower chamber 20 to communicate with each other through the extension-side second passage 182. Therefore, the oil fluid of the upper chamber 19 flows to the lower chamber 20 via the passages in the plurality of passage holes 37 and the annular groove 55 of the piston 18, the orifice 175, the passage in the large diameter hole portion 46 of the piston 18, the piston rod passage part 51 in the passage notch part 30 of the piston rod 21, the passage in the large diameter hole portion 127 and the chamber passage part 131 in the passage groove 121 of the case member 107, the case inner chamber 165, and the passage between the sub-valve 181 and the first valve seat 115. Thereby, even in the extremely low speed region (v1 or more and less than v2) in which the piston speed is lower than the second predetermined value v2, a damping force of the valve properties (properties in which a damping force is substantially proportional to a piston speed) can be obtained.

In the extension stroke, in a normal speed region in which the piston speed is equal to or higher than the second predetermined value v2, the first damping force generation mechanism 41 opens while the second damping force generation mechanism 183 remains in an open state. That is, the sub-valve 181 is separated from the first valve seat 115 to cause the oil fluid to flow from the upper chamber 19 to the lower chamber 20 through the extension-side second passage 182. At this time, a flow of the oil fluid is reduced by the orifices 175 provided downstream of the main valve 91 in the second passage 182, and thereby a pressure applied to the main valve 91 increases and a differential pressure increases. The main valve 91 is separated from the valve seat part 48 to cause the oil fluid to flow from the upper chamber 19 to the lower chamber 20 through the extension-side first passage 92. Therefore, the oil fluid in the upper chamber 19 flows to the lower chamber 20 via the passages in the plurality of passage holes 37 and the annular groove 55 and the passage between the main valve 91 and the valve seat part 48.

In the extension stroke, in the normal speed region in which the piston speed is equal to or higher than the second predetermined value v2, a differential pressure between the upper chamber 19 and the lower chamber 20 is larger than that in the low speed region in which the piston speed is equal to or higher than the first predetermined value v1 and less than the second predetermined value v2, but since the first passage 92 is not narrowed by an orifice, the oil fluid can be caused to flow via the first passage 92 at a high flow rate when the main valve 91 is opened. In addition to this, the second passage 182 is narrowed by the orifice 175, and thereby deformation of the outer annular part 141 on the sub-valve 181 side can be curbed.

At this time, a pressure in an opposite direction from the lower chamber 20 and the case inner chamber 165 is applied to the sub-valve 171 in a closed state. Even when the differential pressure between the upper chamber 19 and the lower chamber 20 increases, the lower chamber 20 and the case inner chamber 165 communicate with each other when the sub-valve 181 is opened. Since the orifice 175 is formed upstream of the sub-valve 171 in the second passage 182, an increase in pressure of the case inner chamber 165 becomes gentle with respect to an increase in pressure of the upper chamber 19, and a pressure difference between the case inner chamber 165 and the lower chamber 20 is inhibited from becoming large. Therefore, the pressure difference between the case inner chamber 165 and the lower chamber 20 received by the sub-valve 171 in a closed state of the outer annular part 141 is inhibited from becoming large. Therefore, a large back pressure from the case inner chamber 165 side to the lower chamber 20 side can be inhibited from being applied to the sub-valve 171 side of the outer annular part 141. Therefore, deformation of the outer annular part 141 on the sub-valve 171 side can be curbed.

In the shock absorber 1, flow paths for allowing the oil fluid to flow from the upper chamber 19 to the lower chamber 20 in the extension stroke are provided with the first passage 92 and the second passage 182 in parallel, and the main valve 91 and the sub-valve 181 are provided in parallel. The orifice 175 is connected in series to the sub-valve 181.

As described above, in the extension stroke, in the normal speed region in which the piston speed is equal to or higher than the second predetermined value v2, the oil fluid can be caused to flow at a high flow rate via the first passage 92 when the main valve 91 is opened. Thereby, a flow rate flowing through the passage between the sub-valve 181 and the first valve seat 115 is reduced. Therefore, valve rigidity of the sub-valve 181 can be reduced. Therefore, for example, a rate of increase in the damping force with respect to increase in the piston speed or the like can be reduced when the piston speed is in the normal speed region (v2 or higher). In other words, a slope of the rate of increase in the damping force on the extension side with respect to the increase in the piston speed in the normal speed region (v2 or higher) can be laid down more than that in the extremely low speed region (less than v2). Thereby, the degree of freedom in design can be expanded.

Of the first damping force generation mechanism 42 and the second damping force generation mechanism 173 which are both on the compression side, the main valve 71 of the first damping force generation mechanism 42 is constituted by stacking the plurality of discs 63 and 64 and thus has a higher rigidity and a higher valve opening pressure than the sub-valve 171 of the second damping force generation mechanism 173 formed by one disc valve 105. Therefore, in the compression stroke, in the extremely low speed region in which the piston speed is lower than the predetermined value, the second damping force generation mechanism 173 opens while the first damping force generation mechanism 42 is in a closed state, and in the normal speed region in which the piston speed is equal to or higher than the predetermined value, both the first damping force generation mechanism 42 and the second damping force generation mechanism 173 open.

The sub-valve 171 is an extremely low speed valve that opens in a region in which the piston speed is extremely low to generate a damping force.

That is, in the compression stroke, a pressure of the lower chamber 20 increases and a pressure of the upper chamber 19 decreases as the piston 18 moves to the lower chamber 20 side. Since none of the first damping force generation mechanisms 41 and 42 and the second damping force generation mechanisms 173 and 183 has a fixed orifice, the oil fluid does not flow until the second damping force generation mechanism 173 is opened. Therefore, the damping force rises sharply. When the piston speed is in a region having a higher speed than a third predetermined value in which the second damping force generation mechanism 173 opens and in an extremely low speed region having a lower speed than a fourth predetermined value that is higher speed than the third predetermined value, the second damping force generation mechanism 173 opens while the first damping force generation mechanism 42 is in a closed state.

That is, the sub-valve 171 is separated from the second valve seat 135 to allow the lower chamber 20 and the upper chamber 19 to communicate with each other through the compression-side second passage 172. Therefore, the oil fluid in the lower chamber 20 flows to the upper chamber 19 via the passage between the sub-valve 171 and the second valve seat 135, the passage between the outer annular part 141 and the inner annular part 142 of the disc valve 105, the case inner chamber 165, the chamber passage part 131 in the passage grooves 121 and the passage in the large diameter hole portion 127 of the case member 107, the piston rod passage part 51 in the passage notch part 30 of the piston rod 21, the passage in the large diameter hole portion 46 of the piston 18, the orifice 175, and the passages in the annular groove 55 and the plurality of passage holes 37 of the piston 18. Thereby, even in the extremely low speed region in which the piston speed is lower than the fourth predetermined value, a damping force of the valve properties (properties in which a damping force is substantially proportional to a piston speed) can be obtained.

In the compression stroke, in the normal speed region in which the piston speed is equal to or higher than the fourth predetermined value described above, the first damping force generation mechanism 42 opens while the second damping force generation mechanism 173 remains in an open state. That is, the sub-valve 171 is separated from the second valve seat 135 to cause the oil fluid to flow from the lower chamber 20 to the upper chamber 19 through the compression-side second passage 172. At this time, since a flow rate of the oil fluid in the second passage 172 is reduced by the orifice 175, a differential pressure generated in the main valve 71 increases, The main valve 71 is separated from the valve seat part 50 to cause the oil fluid to flow from the lower chamber 20 to the upper chamber 19 through the compression-side first passage 72. Therefore, the oil fluid of the lower chamber 20 flows via the passages in the plurality of passage holes 39 and the annular groove 56 and the passage between the main valve 71 and the valve seat part 50. Thereby, even in the normal speed region in which the piston speed is equal to or higher than the fourth predetermined value, a damping force of the valve properties (properties in which a damping force is substantially proportional to a piston speed) can be obtained. A rate of increase in the damping force on the compression side with respect to an increase in the piston speed in the normal speed region is lower than a rate of increase in the damping force on the compression side with respect to an increase in the piston speed in the extremely low speed region. In other words, a slope of the rate of increase in the damping force on the compression side with respect to the increase in the piston speed in the normal speed region can be laid down more than that in the extremely low speed region.

In the compression stroke, a differential pressure between the lower chamber 20 and the upper chamber 19 in the normal speed region in which the piston speed is equal to or higher than the fourth predetermined value is larger than that in the low speed region. Since the first passage 72 is not narrowed by an orifice, the oil fluid can be caused to flow via the first passage 72 at a high flow rate by opening the main valve 71. Thereby, since the flow rate flowing through the sub-valve 171 is reduced, valve rigidity of the sub-valve 171 can be reduced. Therefore, a damping force when the piston speed is in the normal speed region can be reduced, and the degree of freedom in design can be expanded.

Also, at this time (when the piston speed is high), although the differential pressure between the lower chamber 20 and the upper chamber 19 increases, when the second passage 172 is narrowed by the orifice 175, since a pressure in the case inner chamber 165 communicating with the upper chamber 19 via the orifice 175 is the pressure between the lower chamber 20 and the upper chamber 19, a differential pressure between the inside of case inner chamber 165 and the lower chamber 20 can be inhibited from becoming too large. In addition to this, the oil fluid can be caused to flow at a high flow rate via the first passage 72 by opening the main valve 71, and thereby deformation of the outer annular part 141 on the sub-valve 171 side can be curbed.

At this time, a pressure in an opposite direction from the lower chamber 20 and the case inner chamber 165 is applied to the sub-valve 181 in a closed state. Although the differential pressure between the lower chamber 20 and the upper chamber 19 is large, the lower chamber 20 and the case inner chamber 165 communicate with each other when the sub-valve 171 opens, and the orifice 175 is provided between the case inner chamber 165 and the upper chamber 19. Therefore, the pressure in the case inner chamber 165 can be inhibited from decreasing too much and the pressure in the case inner chamber 165 can also be increased in accordance with an increase in the pressure of the lower chamber 20. Therefore, a differential pressure generated on surfaces of the sub-valve 181 on the upstream side and downstream side is small, and a large back pressure from the lower chamber 20 side toward the case inner chamber 165 side can be inhibited from being applied to the sub-valve 181 side of the outer annular part 141.

In the shock absorber 1 described above, flow paths for allowing the oil fluid to flow from the lower chamber 20 to the upper chamber 19 in the compression stroke are provided with the first passage 72 and the second passage 172 in parallel, and the main valve 71 and the sub-valve 171 are provided in parallel. The orifice 175 is connected in series to the sub-valve 171 in the second passage 172.

Further, in the compression stroke, damping force characteristics due to the damping valve mechanism 197 are also combined.

In the extension stroke, the differential pressure between the upper chamber 19 and the lower chamber 20 increases in the normal speed region in which the piston speed is equal to or higher than the second predetermined value. The lower chamber 20 and the case inner chamber 165 communicate with each other due to opening of the sub-valve 181, and moreover, an increase in the pressure of the case inner chamber 165 can be suppressed by the orifice 175 formed upstream of the sub-valve 171. Therefore, deformation of the outer annular part 141 on the sub-valve 171 side due to the back pressure can be curbed. In the compression stroke, the differential pressure between the lower chamber 20 and the upper chamber 19 in the normal speed region in which the piston speed is equal to or higher than the fourth predetermined value is larger than that in the low speed region. When a downstream side of the sub-valve 171 of the second passage 172 is narrowed by the orifice 175 in addition to causing the oil fluid to flow at a high flow rate through the first passage 72, deformation of the sub-valve 171 can be curbed. Therefore, the durability of the sub-valve 171 can be improved.

In the extension stroke, the differential pressure between the upper chamber 19 and the lower chamber 20 in the normal speed region in which the piston speed is equal to or higher than the second predetermined value is larger than that in the low speed region. When the second passage 182 is narrowed by the orifice 175 in addition to causing the oil fluid to flow at a high flow rate through the first passage 92, deformation of the outer annular part 141 on the sub-valve 181 side can be curbed. In the compression stroke, the differential pressure between the lower chamber 20 and the upper chamber 19 increases in the normal speed region in which the piston speed is equal to or higher than the fourth predetermined value. The lower chamber 20 and the case inner chamber 165 communicate with each other when the sub-valve 171 opens, and moreover, a flow of the oil fluid of the case inner chamber 165 to the upper chamber 19 is reduced by the orifice 175 provided between the case inner chamber 165 and the upper chamber 19. Therefore, the differential pressure between the lower chamber 20 and the case inner chamber 165 is small, and deformation of the outer annular part 141 on the sub-valve 181 side due to the back pressure can be curbed. Therefore, the durability of the sub-valve 181 can be improved.

Since the second damping force generation mechanisms 173 and 183 that are independent of each other in the compression stroke and the extension stroke are provided, a degree of freedom in setting the damping force characteristics is increased.

The above-described Patent Documents 1 to 3 describe shock absorbers having two valves that open in the same stroke. When two valves opening in the same stroke are provided, there are problems in that the structure is complicated, the number of parts increases, and the axial length increases. In such a shock absorber, simplified structure is required.

The shock absorber 1 of the first embodiment includes two damping force generation mechanisms including the first damping force generation mechanism 41 and the second damping force generation mechanism 183 that open in the extension stroke. The shock absorber 1 of the first embodiment includes two damping force generation mechanisms including the first damping force generation mechanism 42 and the second damping force generation mechanism 173 that open in the compression stroke. Even with such a configuration, the second damping force generation mechanisms 173 and 183 have a structure including the annular first valve seat 115 formed on the outer cylindrical part 112 of the bottomed cylindrical case member 107 having the bottom part 111 and the outer cylindrical part 112, the annular disc valve 105 in which the outer circumferential side separable part 151 on the outer circumferential side is separably disposed on the first valve seat 115 of the case member 107, and the second valve seat 135 provided on a side of the disc valve 105 opposite to the first valve seat 115 and configured to separably support the inner circumferential side separable part 152 of the disc valve 105 on a radial inner side of the outer circumferential side separable part 151.

Therefore, the structure can be simplified, the number of parts can be reduced, and an increase in the axial length can be minimized.

The disc valve 105 constituting the second damping force generation mechanisms 173 and 183 includes the outer annular part 141 separably disposed on the first valve seat 115 and the second valve seat 135, the inner annular part 142 through which the piston rod 21 is inserted, and the support parts 143 connecting them. Therefore, the outer annular part 141 can be operated in substantially the same manner as a free valve that is not connected to other portions while positional deviation in the radial direction of the outer annular part 141 that is separated from and in contact with the first valve seat 115 and the second valve seat 135 to be opened and closed is suppressed by the inner annular part 142 and the support parts 143.

In the two support parts 143, the two outer connecting parts 161 disposed on the same one side with respect to the center in the radial direction of the disc valve 105 at a distance in the circumferential direction of the disc valve 105 are connected to the outer annular part 141. In the two support parts 143, the two inner connecting parts 162 disposed on the same opposite side with respect to the center in the radial direction of the disc valve 105 at a distance in the circumferential direction of the disc valve 105 are connected to the inner annular part 142. The two connecting arm parts 163 are provided to connect the outer connecting parts 161 and the inner connecting parts 162 which are close to each other in the circumferential direction of the disc valve 105. Moreover, a distance between the two inner connecting parts 162 is larger than a distance between the two outer connecting parts 161. Therefore, the support parts 143 allows the outer annular part 141 to satisfactorily operate in the same manner as a free valve while appropriately suppressing positional deviation in the radial direction of the outer annular part 141 with respect to the inner annular part 142, that is, the piston rod 21 and the case member 107.

Since the second valve seat 135 that supports the disc valve 105 has a bendable configuration, rigidity of a support point of the disc valve 105 can be changed, and a degree of freedom in tuning of the second damping force generation mechanism 183 that opens with the disc valve 105 supported by the second valve seat 135 is increased.

The case member 107 includes the case part 167 that forms the chamber passage part 131 and the case inner chamber 165, and the washer part 166 that covers the incomplete screw part 109 of the piston rod 21. Therefore, the number of parts can be further reduced compared to a case in which these are separately provided.

The orifice 175 is disposed upstream of the sub-valve 181 in a flow at the time of the extension stroke in which the sub-valve 181 of the second passage 182 opens. Thereby, a flow of the oil fluid flowing from the lower chamber 20 into the case inner chamber 165 due to opening of the sub-valve 171 and then flowing to the upper chamber 19 at the time of the compression stroke is reduced by the orifice 175. Therefore, a differential pressure between the case inner chamber 165 and the lower chamber 20 decreases, and the sub-valve 181 in a closed state that receives a back pressure from the lower chamber 20 receives the same pressure as the lower chamber 20 from the case inner chamber 165. Therefore, the received back pressure (differential pressure) is reduced. Accordingly, the durability of the sub-valve 181 can be improved.

The second passages 172 and 182 are not passages in constant communication and do not have a fixed orifice in constant communication. Therefore, effects of suppressing the back pressure received by the sub-valve 181 are high.

The orifice 175 is formed by cutting out the disc 82 that comes into contact with the piston 18 in the extension-side first damping force generation mechanism 41. Therefore, the orifice 175 can be easily formed.

Parts of the second passages 172 and 182 are formed by cutting out the piston rod 21. Therefore, the second passages 172 and 182 can be easily formed.

The differential pressure between the case inner chamber 165 and the lower chamber 20 does not increase in both the expansion and compression strokes. Therefore, a pressed part of a thin plate can be used for the disc valve 105, and it is advantageous in terms of manufacturability and weight reduction of the disc valve 105.

Figure 5:
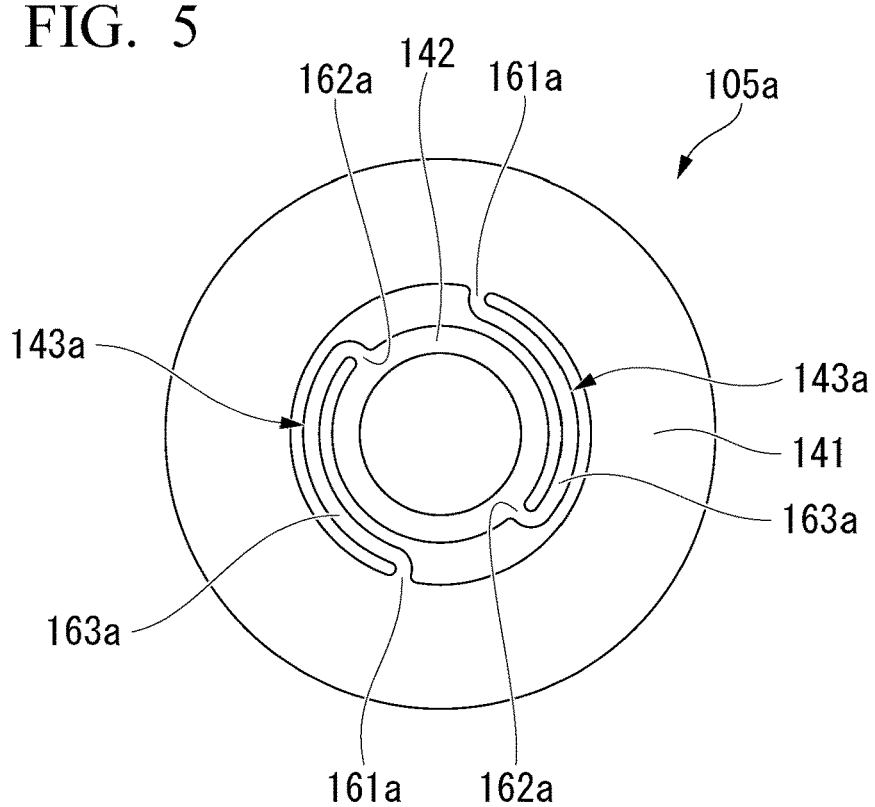
FIG. 5 is a plan view illustrating modified example 1 of the disc valve of the shock absorber of the first embodiment according to the present invention.

Instead of the above-described disc valve 105, for example, a disc valve 105a of modified example 1 as illustrated in FIG. 5 may be used. The disc valve 105a has the outer annular part 141 and the inner annular part 142 similar to those of the disc valve 105 and has two support parts 143a that are partially different from the support part 143.

The two support parts 143a have two outer connecting parts 161a disposed on the same straight line passing through a center of the disc valve 105a. These outer connecting parts 161a are connected to the outer annular part 141. The two outer connecting parts 161a are disposed in different phases from each other by 180 degrees in the circumferential direction of the outer annular part 141. The two outer connecting parts 161*a* both protrude radially inward of the outer annular part 141 from inner circumferential edge portions of the outer annular part 141.

The two support parts 143*a* have two inner connecting parts 162*a* disposed on the same straight line passing through a center of the disc valve 105*a*. These inner connecting parts 162*a* are connected to the inner annular part 142. The two inner connecting parts 162*a* are disposed in different phases from each other by 180 degrees in the circumferential direction of the inner annular part 142. The two inner connecting parts 162*a* both protrude radially outward of the inner annular part 142 from outer circumferential edge portions of the inner annular part 142. Either the two outer connecting parts 161*a* has a smaller distance to one of the two inner connecting parts 162*a* than a distance to the other thereof in the circumferential direction of the disc valve 105*a*. In other words, either the two inner connecting parts 162*a* has a smaller distance to one of the two outer connecting parts 161*a* than a distance to the other thereof in the circumferential direction of the disc valve 105*a*.

A distance between the outer connecting part 161*a* and the inner connecting part 162*a* that are distant from each other in the circumferential direction of the disc valve 105*a* on one side is the same as a distance between the outer connecting part 161*a* and the inner connecting part 162*a* that are distant from each other in the circumferential direction of the disc valve 105*a* on the other side.

Further, the two support parts 143*a* include two connecting arm parts 163*a* provided to connect the outer connecting parts 161*a* and the inner connecting parts 162*a* that are distant from each other in the circumferential direction of the disc valve 105*a*. That is, one connecting arm part 163*a* connecting one of the outer connecting parts 161*a* and one of the inner connecting parts 162*a* that are distant from each other in the circumferential direction of the disc valve 105*a* is provided on one side of the disc valve 105*a*. These outer connecting part 161*a*, inner connecting part 162*a*, and connecting arm part 163*a* constitute one of the support parts 143*a*. The other connecting arm part 163*a* connecting the other of the outer connecting parts 161*a* and the other of the inner connecting parts 162*a* that are distant from each other in the circumferential direction of the disc valve 105*a* is provided on the other side of the disc valve 105*a*. These outer connecting part 161*a*, inner connecting part 162*a*, and connecting arm part 163*a* constitute the other of the support parts 143*a*.

The two connecting arm parts 163*a* extend in an arc shape along an inner circumferential surface of the outer annular part 141 and an outer circumferential surface of the inner annular part 142. The two connecting arm parts 163*a* are disposed on the same circle concentric with the outer annular part 141 and the inner annular part 142. The two connecting arm parts 163*a* have a radial distance from the inner circumferential surface of the outer annular part 141 that is the same as a radial distance from the outer circumferential surface of the inner annular part 142.

In the disc valve 105*a* having such a configuration, similarly to the disc valve 105, the two support parts 143*a* allows the outer annular part 141 to satisfactorily operate in the same manner as a free valve while suppressing positional deviation in the radial direction of the outer annular part 141 with respect to the inner annular part 142.

Figure 6:
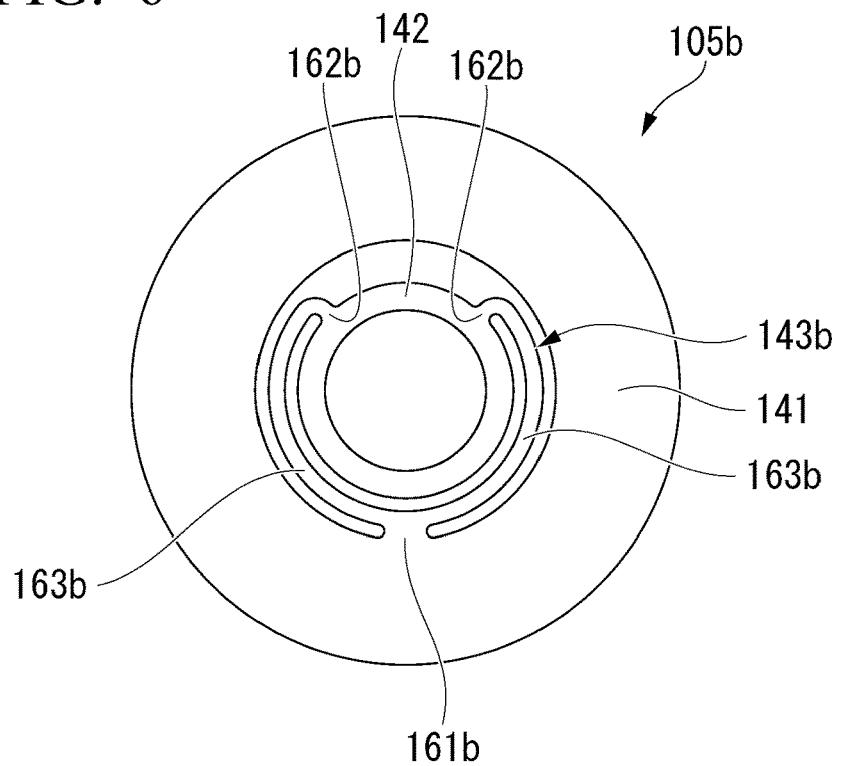
FIG. 6 is a plan view illustrating modified example 2 of the disc valve of the shock absorber of the first embodiment according to the present invention.

Instead of the disc valve 105 described above, for example, a disc valve 105*b* of modified example 2 as illustrated in FIG. 6 may be used. The disc valve 105*b* has the outer annular part 141 and the inner annular part 142 similar to those of the disc valve 105. The disc valve 105*b* has a support part 143*b* that is partially different from the support part 143.

Only one support part 143*b* is provided in the disc valve 105*b*. The support part 143*b* has one outer connecting part 161*b* disposed on one side with respect to a center in the radial direction of the disc valve 105*b*. In the support part 143*b*, the outer connecting part 161*b* is connected to the outer annular part 141. The outer connecting part 161*b* protrudes radially inward of the outer annular part 141 from an inner circumferential edge portion of the outer annular part 141.

The support part 143*b* includes two inner connecting parts 162*b* disposed on the same opposite side with respect to the center, that is, on a side opposite to the outer connecting part 161*b* in the radial direction of the disc valve 105*b* at a distance in the circumferential direction of the disc valve 105*b*. These inner connecting parts 162*b* are connected to the inner annular part 142. The two inner connecting parts 162*b* are disposed to be aligned in the circumferential direction of the inner annular part 142 on the same opposite side with respect to the center, that is, on a side opposite to the outer connecting part 161*b* in the radial direction of the inner annular part 142. The two inner connecting parts 162*b* both protrude radially outward of the inner annular part 142 from outer circumferential edge portions of the inner annular part 142.

The center of the disc valve 105*b* and the outer connecting part 161*b* are disposed on a straight line perpendicular to a midpoint of a straight line connecting the two inner connecting parts 162*b*. A distance between the outer connecting part 161*b* and one of the inner connecting parts 162*b* is the same as a distance between the outer connecting part 161*b* and the other of the inner connecting parts 162*b*. This distance is longer than a distance between the two inner connecting parts 162*b*.

Further, the support part 143*b* includes two connecting arm parts 163*b* provided to extend from a side of the one outer connecting part 161*b* opposite to the outer annular part 141 to both sides in the circumferential direction of the disc valve 105 to be connected to the inner connecting parts 162 on both sides. That is, the disc valve 105*b* includes one connecting arm part 163*b* provided to connect the outer connecting part 161*b* and one inner connecting part 162*b*, and the other connecting arm part 163*b* provided to connect the outer connecting part 161*b* and the other inner connecting part 162*b*.

The two connecting arm parts 163*b* each extend in one arc shape along an inner circumferential surface of the outer annular part 141 and an outer circumferential surface of the inner annular part 142. The two connecting arm parts 163*b* are disposed on the same circle concentric with the outer annular part 141 and the inner annular part 142. The two connecting arm parts 163*b* have a radial distance from the inner circumferential surface of the outer annular part 141 that is the same as a radial distance from the outer circumferential surface of the inner annular part 142.

In the disc valve 105*b* having such a configuration, similarly to the disc valve 105, the one support part 143*b* allows the outer annular part 141 to operate in the same manner as a free valve while suppressing positional deviation in the radial direction of the outer annular part 141 with respect to the inner annular part 142.

Figure 7:
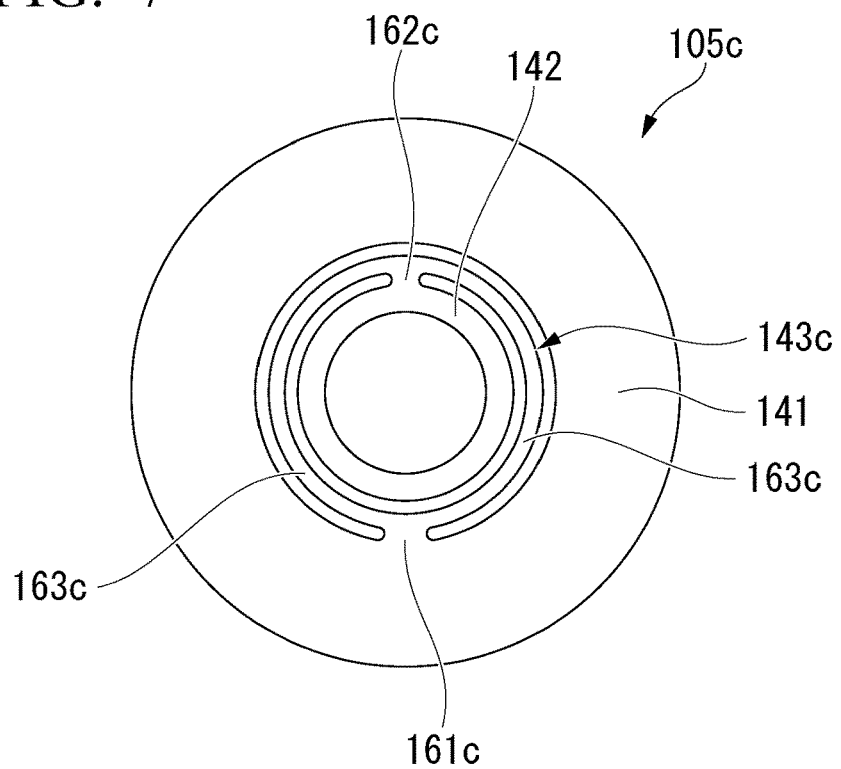
FIG. 7 is a plan view illustrating modified example 3 of the disc valve of the shock absorber of the first embodiment according to the present invention.

Instead of the disc valve 105 described above, for example, a disc valve 105*c* of modified example 3 as illustrated in FIG. 7 may be used. The disc valve 105c has the outer annular part 141 and the inner annular part 142 similar to those of the disc valve 105 and has a support part 143c that is partially different from the support part 143.

Only one support part 143c is provided in the disc valve 105c. The support part 143c has one outer connecting part 161c disposed on one side with respect to a center in the radial direction of the disc valve 105c. The outer connecting part 161c is connected to the outer annular part 141. The outer connecting part 161b protrudes radially inward of the outer annular part 141 from an inner circumferential edge portion of the outer annular part 141.

The support part 143c includes one inner connecting part 162c disposed on an opposite side with respect to the center, that is, on a side opposite to the outer connecting part 161c in the radial direction of the disc valve 105c. The inner connecting part 162c is connected to the inner annular part 142. The one inner connecting part 162c protrudes radially outward of the inner annular part 142 from an outer circumferential edge portion of the inner annular part 142.

The one outer connecting part 161c and the one inner connecting part 162b are disposed in different phases from each other by 180 degrees in the circumferential direction of the disc valve 105c. In other words, a line connecting the outer connecting part 161c, the center of the disc valve 105c, and the inner connecting part 162c forms a straight line.

Further, the support part 143c includes two connecting arm parts 163c provided to extend from a side of the outer connecting part 161c opposite to the outer annular part 141 to both sides in the circumferential direction of the disc valve 105 to be connected to the inner connecting part 162c. That is, the disc valve 105c includes one connecting arm part 163c provided to connect the outer connecting part 161c and the inner connecting part 162c on one side, and the other connecting arm part 163c provided to connect the outer connecting part 161c and the inner connecting part 162c on the other side.

The two connecting arm parts 163c each extend in one circular shape along an inner circumferential surface of the outer annular part 141 and an outer circumferential surface of the inner annular part 142. The two connecting arm parts 163c are disposed on the same circle concentric with the outer annular part 141 and the inner annular part 142. The two connecting arm parts 163c have a radial distance from the inner circumferential surface of the outer annular part 141 that is the same as a radial distance from the outer circumferential surface of the inner annular part 142.

In the disc valve 105c having such a configuration, similarly to the disc valve 105, the one support part 143c allows the outer annular part 141 to operate in the same manner as a free valve while suppressing positional deviation in the radial direction of the outer annular part 141 with respect to the inner annular part 142.

Figure 8:
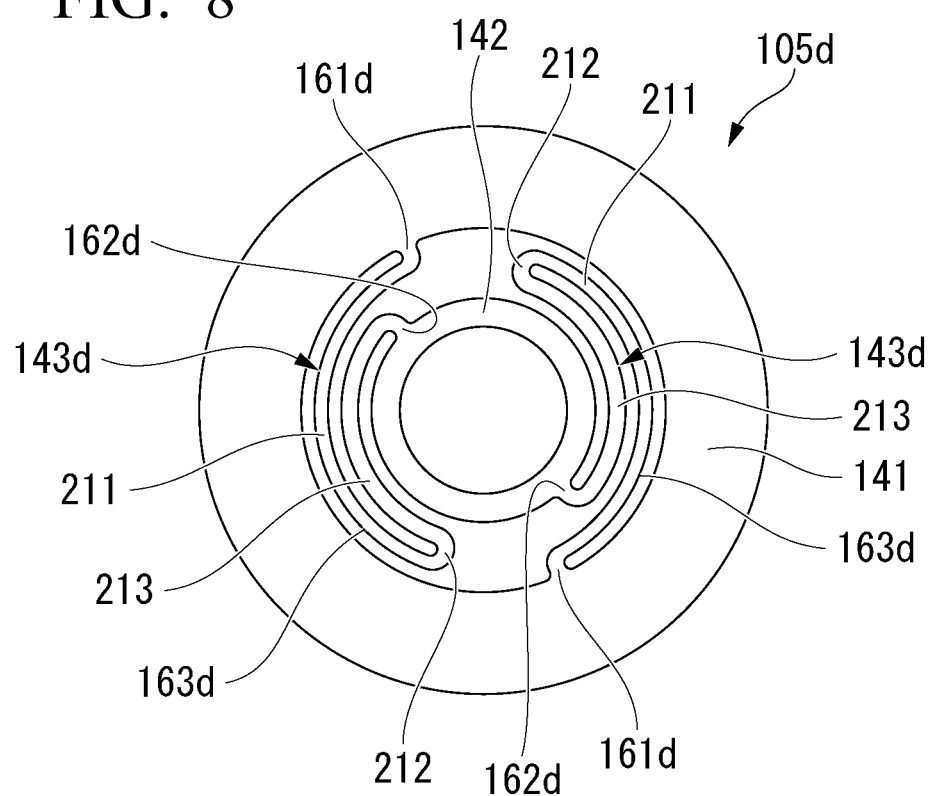
FIG. 8 is a plan view illustrating modified example 4 of the disc valve of the shock absorber of the first embodiment according to the present invention.

Instead of the disc valve 105 described above, for example, a disc valve 105d of modified example 4 as illustrated in FIG. 8 may be used. The disc valve 105d has the outer annular part 141 and the inner annular part 142 similar to those of the disc valve 105. The disc valve 105d has two support parts 143d that are partially different from the support part 143.

The two support parts 143d have two outer connecting parts 161d disposed on the same straight line passing through a center of the disc valve 105d. These outer connecting parts 161d are connected to the outer annular part 141. The two outer connecting parts 161d are disposed in different phases from each other by 180 degrees in the circumferential direction of the outer annular part 141. The two outer connecting parts 161d both protrude radially inward of the outer annular part 141 from inner circumferential edge portions of the outer annular part 141.

The two support parts 143d have two inner connecting parts 162d disposed on the same straight line passing through the center of the disc valve 105d. The two inner connecting parts 162d are connected to the inner annular part 142. The two inner connecting parts 162d are disposed in different phases from each other by 180 degrees in the circumferential direction of the inner annular part 142. The two inner connecting parts 162d both protrude radially outward of the inner annular part 142 from outer circumferential edge portions of the inner annular part 142. Either the two outer connecting parts 161d has a smaller distance to one of the two inner connecting parts 162d than a distance to the other thereof in the circumferential direction of the disc valve 105d. In other words, either the two inner connecting parts 162d has a smaller distance to one of the two outer connecting parts 161d than a distance to the other thereof in the circumferential direction of the disc valve 105d.

A distance between the outer connecting part 161d and the inner connecting part 162d that are close to each other in the circumferential direction of the disc valve 105d on one side is the same as a distance between the outer connecting part 161d and the inner connecting part 162d that are close to each other in the circumferential direction of the disc valve 105d on the other side.

Further, the two support parts 143d include two connecting arm parts 163d provided to connect the outer connecting parts 161d and the inner connecting parts 162d that are close to each other in the circumferential direction of the disc valve 105d. That is, one connecting arm part 163d connecting one of the outer connecting parts 161d and one of the inner connecting parts 162d that are close to each other in the circumferential direction of the disc valve 105d is provided on one side in the disc valve 105d. These outer connecting part 161d, inner connecting part 162d, and connecting arm part 163d constitute one of the support parts 143d. The other connecting arm part 163d connecting the other of the outer connecting parts 161d and the other of the inner connecting parts 162d that are close to each other in the circumferential direction of the disc valve 105d is provided on the other side in the disc valve 105d. These outer connecting part 161d, inner connecting part 162d, and connecting arm part 163d constitute the other of the support parts 143d.

The two connecting arm parts 163d includes two outer arcuate parts 211, two folded-back parts 212, and two inner arcuate parts 213. The connecting arm part 163d on one side includes one outer arcuate part 211, one folded-back part 212, and one inner arcuate part 213. The connecting arm part 163d on the other side includes the other outer arcuate part 211, the other folded-back part 212, and the other inner arcuate part 213.

The outer arcuate part 211 on one side extends from one outer connecting part 161d to the front of the other outer connecting part 161d beyond one inner connecting part 162d on a side closer to the one outer connecting part 161d in an arc shape along an inner circumferential surface of the outer annular part 141 and an outer circumferential surface of the inner annular part 142. One folded-back part 212 is folded back from an end portion on a side of the one outer arcuate part 211 opposite to the one outer connecting part 161d to the inner annular part 142 side. One inner arcuate part 213 extends from an end portion on a side of the one folded-back part 212 opposite to the one outer arcuate part 211 in an arc shape along the inner circumferential surface of the outer annular part 141 and the outer circumferential surface of the inner annular part 142 to be connected to the one inner connecting part 162d.

The outer arcuate part 211 on the other side extends from the other outer connecting part 161d to the front of the one outer connecting part 161d beyond the other inner connecting part 162d on a side closer to the outer connecting part 161d in an arc shape along the inner circumferential surface of the outer annular part 141 and the outer circumferential surface of the inner annular part 142. The other folded-back part 212 is folded back from an end portion on a side of the other outer arcuate part 211 opposite to the other outer connecting part 161d to the inner annular part 142 side. The other inner arcuate part 213 extends from an end portion on a side of the other folded-back part 212 opposite to the other outer arcuate part 211 in an arc shape along the inner circumferential surface of the outer annular part 141 and the outer circumferential surface of the inner annular part 142 to be connected to the other inner connecting part 162d.

The one outer arcuate part 211 and the other outer arcuate part 211 are disposed on one circle concentric with the outer annular part 141 and the inner annular part 142. The one inner arcuate part 213 and the other inner arcuate part 213 are disposed on one circle concentric with the outer annular part 141 and the inner annular part 142.

In the disc valve 105d having such a configuration, similarly to the disc valve 105, the two support parts 143d allow the outer annular part 141 to satisfactorily operate more similar to an operation of a free valve while suppressing positional deviation in the radial direction of the outer annular part 141 with respect to the inner annular part 142.

Second Embodiment

Next, a second embodiment will be described mainly on the basis of FIG. 9, focusing on differences from the first embodiment. Portions common to those in the first embodiment will be denoted by the same terms and the same reference signs.

Figure 9:
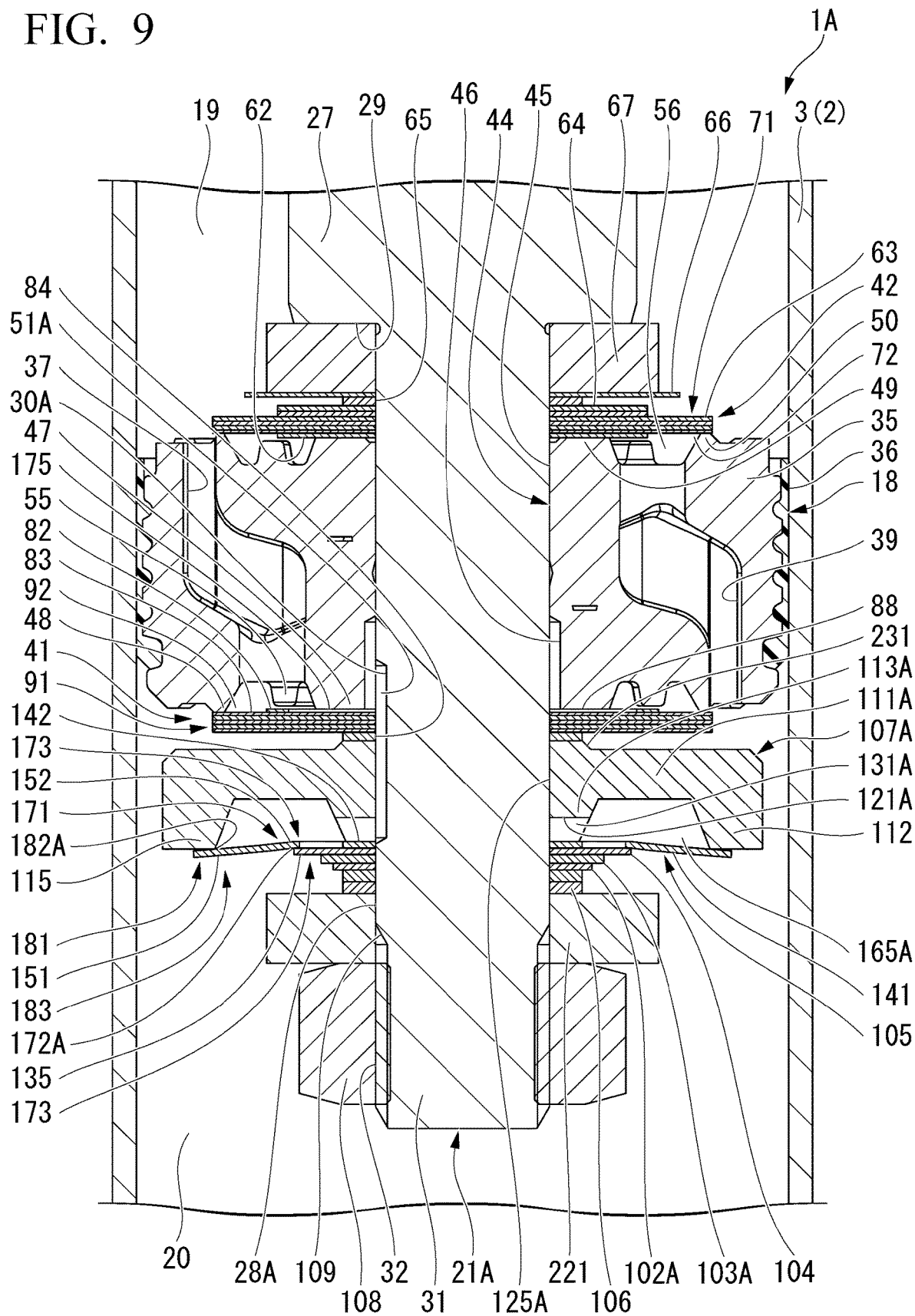
FIG. 9 is a cross-sectional view illustrating a main part of a shock absorber of a second embodiment according to the present invention.

In the shock absorber 1A of the second embodiment, as illustrated in FIG. 9, a piston rod 21A that is partially different from the piston rod 21 of the first embodiment is used. The piston rod 21A includes a mounting shaft part 28A that is partially different from the mounting shaft part 28. A passage notch part 30A having a shorter axial length of the piston rod 21A than the passage notch part 30 is formed on the mounting shaft part 28A. Compared to the passage notch part 30, the passage notch part 30A has the same end portion position on a shaft step part 29 side, and an end portion position on a side opposite to the shaft step part 29 is positioned further on the shaft step part 29 side. In the piston rod 21A, the inside of the passage notch part 30A is a piston rod passage part 51A.

In the shock absorber 1A of the second embodiment, one disc 84 similar to that of the first embodiment, a case member 107A (case part) partially different from the case member 107 of the first embodiment, one disc valve 105 similar to that of the first embodiment, one disc 104 similar to that of the first embodiment, one disc 103A that differs from the disc 103 of the first embodiment only in that an outer diameter is small, one disc 102A that differs from the disc 102 of the first embodiment only in that an outer diameter is small, a plurality of (specifically, two) discs 106 and a washer 221 (washer part) similar to those in the first embodiment, and a washer 221 (washer part) are provided between the main valve 91 on an extension side as in the first embodiment and a nut 108 in that order from a side of a main valve 91 with the mounting shaft part 28A of the piston rod 21A fitted to inner sides thereof. Then, the nut 108 is screwed onto a male screw 32 of a screw shaft part 31 protruding further than the washer 221 of the piston rod 21A. The nut 108 is in contact with the washer 221.

The case member 107A is also an integrally formed product having a bottomed cylindrical shape and includes a bottom part 111A having a bored disc shape, an outer cylindrical part 112 similar to that of the first embodiment protruding from an outer circumferential edge portion of the bottom part 111A to one side in the axial direction of the bottom part 111A, an annular inner cylindrical part 113A protruding from an inner circumferential edge portion of the bottom part 111A to one side in the axial direction of the bottom part 111A, and an annular inner cylindrical part 231 protruding from an inner circumferential edge portion of the bottom part 111A to the other side in the axial direction of the bottom part 111.

The outer cylindrical part 112 and the inner cylindrical part 113A are disposed coaxially and protrude from the bottom part 111A to the same side in the axial direction. The outer cylindrical part 112 has a longer axial length than the inner cylindrical part 113A. The inner cylindrical part 231 protrudes from the bottom part 111A to a side opposite to the outer cylindrical part 112 and the inner cylindrical part 113A in the axial direction.

A distal end surface of the inner cylindrical part 113A on a side opposite to the bottom part 111A extends perpendicular to a central axis of the case member 107A. A plurality of passage grooves 121A that open to the distal end surface of the inner cylindrical part 113A and penetrate in the radial direction are formed at intervals in the circumferential direction. A distal end surface of the inner cylindrical part 231 on a side opposite to the bottom part 111A in the axial direction extends perpendicular to the central axis of the case member 107A. An outer diameter of the distal end surface of the inner cylindrical part 231 is the same as an outer diameter of the disc 84.

At a center in the radial direction of the case member 107A, an insertion hole 125A through which the mounting shaft part 28A of the piston rod 21A is inserted is formed to penetrate the bottom part 111A and the inner cylindrical parts 113A and 231 in the axial direction. The case member 107A is directed so that the inner cylindrical part 231 and the bottom part 111A are positioned on a piston 18 side with respect to the outer cylindrical part 112 and the inner cylindrical part 113A. The case member 107A is fitted on the mounting shaft part 28 in the insertion hole 125A to be positioned in the radial direction. The plurality of passage grooves 121A are all open to an inner circumferential surface of the insertion hole 125A. A chamber passage part 131A in the plurality of passage grooves 121A is in constant communication with the piston rod passage part 51A in the passage notch part 30A of the piston rod 21A while axial positions thereof overlap each other The outer cylindrical part 112 of the case member 107A includes a first valve seat 115 similar to that of the first embodiment where the disc valve 105 is separated and seated.

Outer diameters of the discs 104, 103A, and 102A become larger as they are positioned closer to the bottom part 111A of the case member 107A in the axial direction. The discs 106 have an outer diameter smaller than an outer diameter of the disc 102A. The disc 104, together with the discs 103A and 102A stacked on the disc 104, constitutes a bendable second valve seat 135 similar to the first embodiment where the disc valve 105 is separated and seated. In the disc valve 105, an inner annular part 142 is in contact with the inner cylindrical part 113A of the case member 107A. The disc valve 105 and the case member 107A form a case inner chamber 165A therein.

The washer 221 is a part similar to an annular member 67. The washer 221 is thicker and more rigid than the disc valve 105 and the discs 104, 103A, and 102A. An incomplete screw part 109 of the piston rod 21A is disposed within an axial range of the washer 221. Within the axial range of the washer 221, the mounting shaft part 28 and the male screw 32 on both sides of the washer 221 in the axial direction are also disposed. When the incomplete screw part 109 is covered by the washer 221, the discs 106 or the like can be properly fitted on the mounting shaft part 28 while axial positions thereof completely overlap each other. Thereby, the nut 108 can be properly screwed onto the male screw 32, which is a complete screw part, while axial positions thereof completely overlap each other. The washer 221 also serves the role of stabilizing and balancing a fastening axial force of the nut 108.

The case inner chamber 165A constantly communicates with the piston rod passage part 51A in the passage notch part 30A via the chamber passage part 131A in the passage grooves 121A of the inner cylindrical part 113A. In other words, the chamber passage part 131A allows communication from the piston rod passage part 51A to the case inner chamber 165A between the bottom part 111A and the disc valve 105. Therefore, the case inner chamber 165A constantly communicate with an upper chamber 19 via the chamber passage part 131A in the passage grooves 121A, the piston rod passage part 51A in the passage notch part 30A of the piston rod 21A, a passage in a large diameter hole portion 46 of the piston 18, a passage in a notch part 88 of a disc 82, and passages in an annular groove 55 and a plurality of passage holes 37 of the piston 18.

As in the first embodiment, when a sub-valve 171 on an inner circumferential side of an outer annular part 141 of the disc valve 105 is separated from the second valve seat 135, a lower chamber 20 and the case inner chamber 165 are allowed to communicate with each other via a gap between the sub-valve 171 and the second valve seat 135 and a passage between the outer annular part 141 and the inner annular part 142 of the disc valve 105. Thereby, the lower chamber 20 communicates with the upper chamber 19.

The passage between the sub-valve 171 and the second valve seat 135 that appears when the valve opens, the passage between the outer annular part 141 and the inner annular part 142 of the disc valve 105, the case inner chamber 165A, the chamber passage part 131A in the passage grooves 121A of the case member 107A, the piston rod passage part 51A in the passage notch part 30A of the piston rod 21A, the passage in the large diameter hole portion 46 of the piston 18, the passage in the notch part 88 of the disc 82, and the passages in the annular groove 55 and the plurality of passage holes 37 constitute a compression-side second passage 172A, similar to the second passage 172 of the first embodiment, through which an oil fluid flows out from the lower chamber 20 on an upstream side to the upper chamber 19 on a downstream side in the cylinder 2 due to the piston 18 moving to the lower chamber 20 side. A compression-side second damping force generation mechanism 173 formed by the sub-valve 171 and the second valve seat 135 is provided in the second passage 172A. The compression-side second damping force generation mechanism 173 formed by the sub-valve 171 and the second valve seat 135 operates in the same manner as in the first embodiment and opens and closes the second passage 172A. Also in the second passage 172A, an orifice 175 in the notch part 88 of the disc 82 is provided on the upper chamber 19 side with respect to the sub-valve 171.

As in the first embodiment, when a sub-valve 181 on an outer circumferential side of the outer annular part 141 of the disc valve 105 is separated from the first valve seat 115, the case inner chamber 165A and the lower chamber 20 are allowed to communicate with each other via a gap between the sub-valve 181 and the first valve seat 115. Thereby, the upper chamber 19 communicates with the lower chamber 20.

The passages in the plurality of passage holes 37 and the annular groove 55 of the piston 18, the passage in the notch part 88 of the disc 82, the passage in the large diameter hole portion 46 of the piston 18, the piston rod passage part 51A in the passage notch part 30A of the piston rod 21A, the chamber passage part 131A in the passage grooves 121A of the case member 107A, the case inner chamber 165A, and the passage between the sub-valve 181 and the first valve seat 115 that appears when the valve opens constitute an extension-side second passage 182A, similar to the second passage 182 of the first embodiment, through which the oil fluid flows out from the upper chamber 19 on an upstream side to the lower chamber 20 on a downstream side in the cylinder 2 due to the piston 18 moving to the upper chamber 19 side. An extension-side second damping force generation mechanism 183 formed by the sub-valve 181 and the first valve seat 115 is provided in the second passage 182A and operates in the same manner as in the first embodiment to open and close the second passage 182A. Also in the second passage 182A, the orifice 175 in the notch part 88 of the disc 82 is provided on the upper chamber 19 side with respect to the sub-valve 181.

When the piston 18 and the like are assembled to the piston rod 21A, the annular member 67, a disc 66, a disc 65, a plurality of discs 64, a plurality of discs 63, discs 62, and the piston 18 are stacked in that order on the shaft step part 29 as in the first embodiment while the screw shaft part 31 and the mounting shaft part 28A of the piston rod 21A are inserted therethrough. In addition, the disc 82, a plurality of discs 83, the disc 84, the case member 107A, the disc valve 105, the disc 104, the disc 103A, the disc 102A, the plurality of discs 106, and the washer 221 are stacked in that order on the piston 18 while the screw shaft part 31 and the mounting shaft part 28A are inserted therethrough. At this time, the case member 107A is directed so that the outer cylindrical part 112 and the inner cylindrical part 113A are positioned on a side opposite to the piston 18 with respect to the bottom part 111A. At this time, the case member 107A comes into contact with the disc 84 at the inner cylindrical part 231 and comes into contact with the disc valve 105 at the inner cylindrical part 113A and the outer cylindrical part 112.

In this state, the nut 108 is screwed onto the male screw 32 of the screw shaft part 31 of the piston rod 21A protruding further than the washer 221 so that inner circumferential sides of the nut 108 and the shaft step part 29 are clamped together in the axial direction.

In this state, inner circumferential sides of the disc valve 105 and the discs 104, 103A, and 102A constituting the second valve seat 135 are clamped by the inner cylindrical part 113A of the case member 107A and the discs 106. At this time, in the disc valve 105, the inner annular part 142 is clamped, and the support part 143 and the outer annular part 141 are not clamped. At the same time, the sub-valve 171 of the outer annular part 141 of the disc valve 105 comes into contact with the second valve seat 135 at the inner circumferential side separable part 152 from the piston 18 side over the entire circumference, and the sub-valve 181 of the outer annular part 141 of the disc valve 105 comes into contact with the first valve seat 115 at the outer circumferential side separable part 151 from a side opposite to the piston 18 over the entire circumference. At this time, since the second valve seat 135 is positioned on the piston 18 side in the axial direction with respect to the first valve seat 115, the outer annular part 141 is deformed in a tapered shape such that it approaches the piston 18 in the axial direction toward the inner side in the radial direction.

The shock absorber 1A of the second embodiment operates in the same manner as the shock absorber 1 of the first embodiment.

In the shock absorber 1A of the second embodiment, since the case member 107A as a case part forming the case inner chamber 165A and the washer 221 as a washer part covering the incomplete screw part 109 of the piston rod 21A are separately formed, a direction of the case member 107A can be made such that the bottom part 111A faces the main valve 91 in the axial direction. Therefore, when the main valve 91 is deformed, the bottom part 111A comes into contact with the main valve 91 so that deformation more than that is restricted. Therefore, the durability of the main valve 91 can be improved.

Further, in the second embodiment, any one of the above-described disc valves 105a to 105d can be selected and applied instead of the disc valve 105.

Third Embodiment

Next, a third embodiment will be described mainly on the basis of FIGS. 10 and 11, focusing on differences from the second embodiment. Portions common to those in the second embodiment will be denoted by the same terms and the same reference signs.

Figure 10:
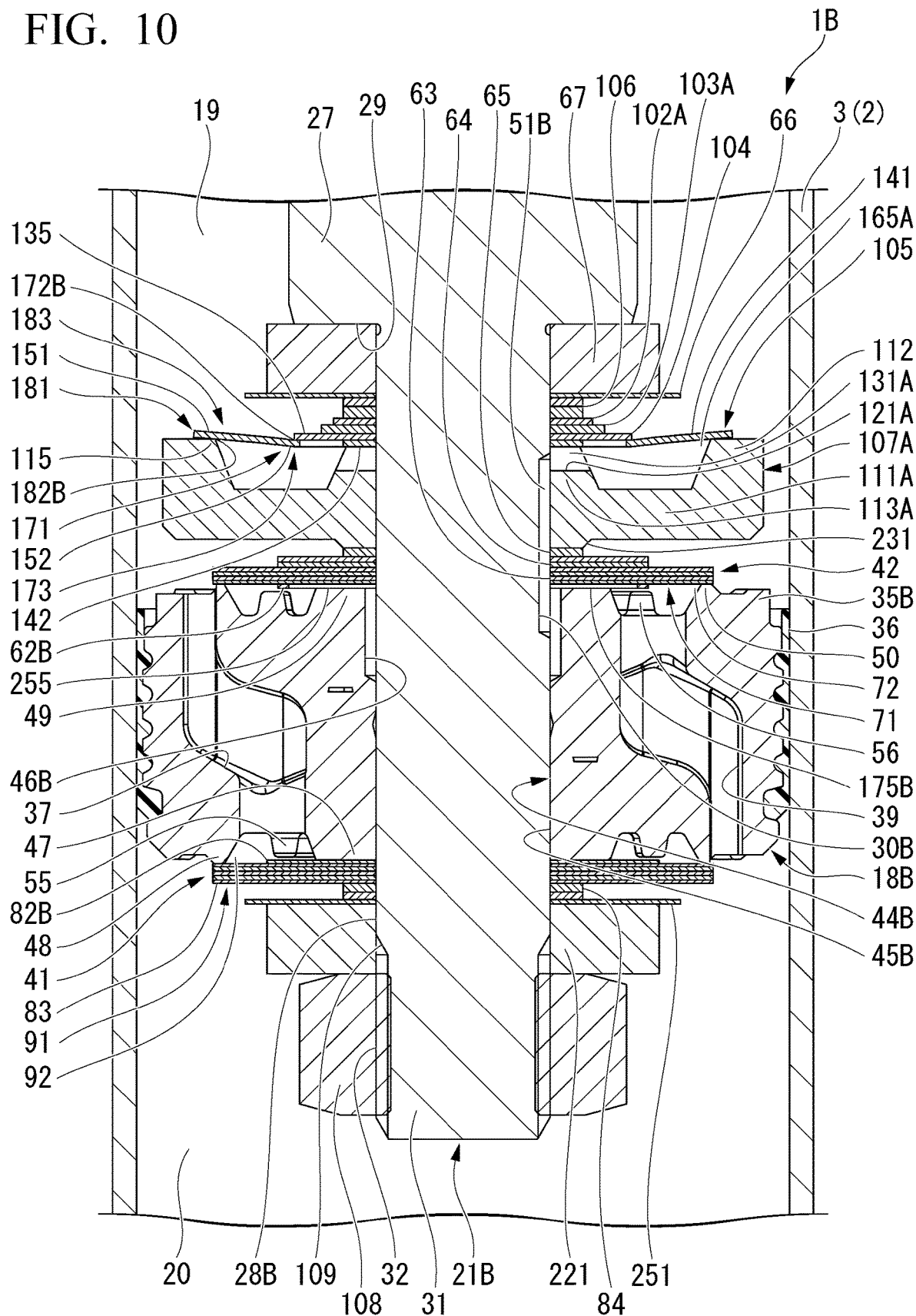
FIG. 10 is a cross-sectional view illustrating a main part of a shock absorber of a third embodiment according to the present invention.
Figure 11:
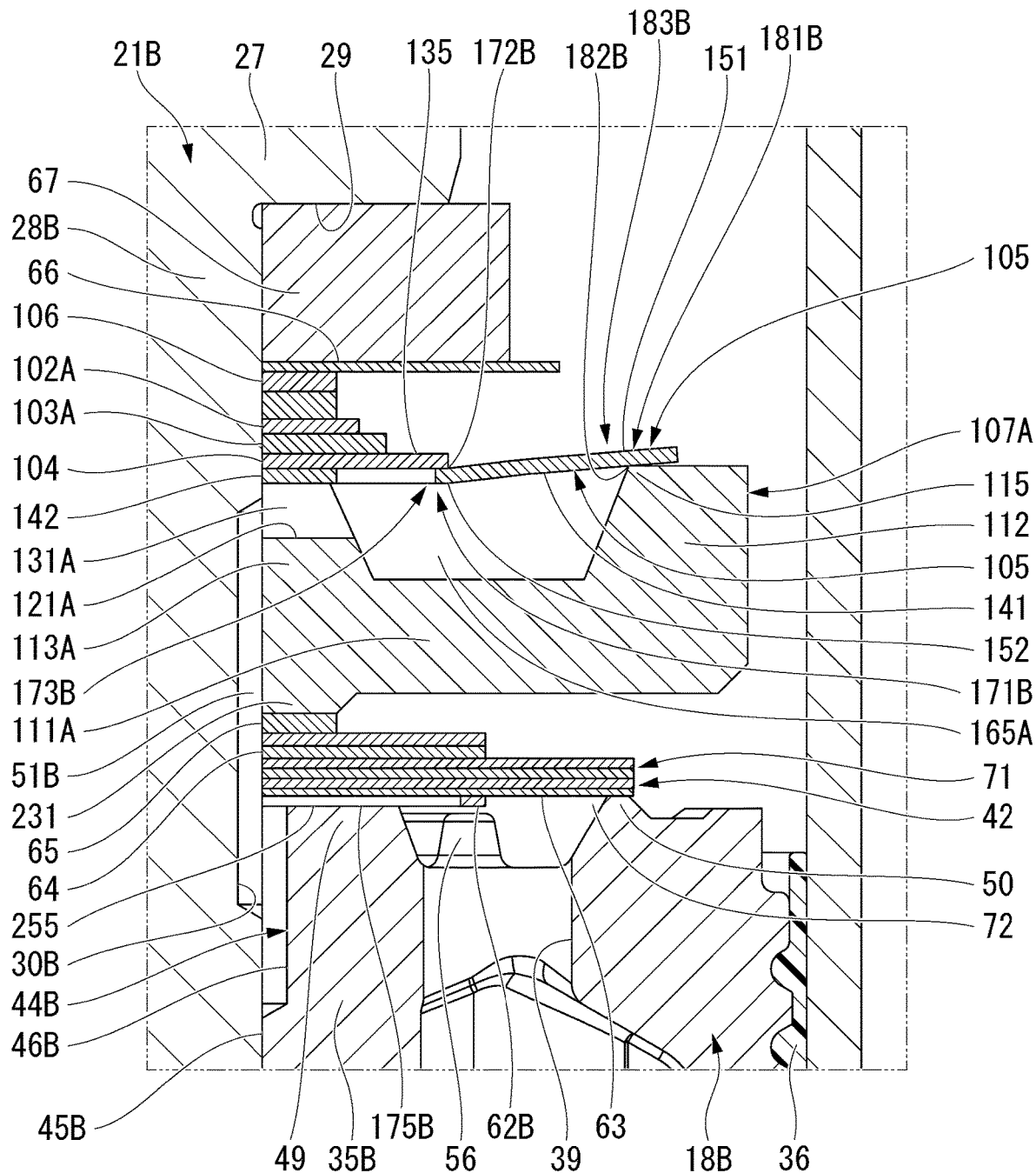
FIG. 11 is a partial cross-sectional view illustrating surroundings of a disc valve of the shock absorber of the third embodiment according to the present invention.

In the shock absorber 1B of the third embodiment, as illustrated in FIG. 10, a piston rod 21B that is partially different from the piston rod 21A of the second embodiment is used. The piston rod 21B has a mounting shaft part 28B that is partially different from the mounting shaft part 28A, and the mounting shaft part 28B includes a passage notch part 30B formed to be different from the passage notch part 30A in that a position of the piston rod 21B in an axial direction is shifted to a main shaft part 27 side. In the piston rod 21B, the inside of the passage notch part 30B serves as a piston rod passage part 51B.

In the shock absorber 1B of the third embodiment, a piston 18B that is partially different from the piston 18 of the first and second embodiments is used. The piston 18B has a piston main body 35B that is partially different from the piston main body 35. In the piston main body 35B, an insertion hole 44B formed at a center in the radial direction is different from the insertion hole 44. A small diameter hole portion 45B similar to the small diameter hole portion 45 is provided on an inner seat part 47 side in the axial direction, and a large diameter hole portion 46B similar to the large diameter hole portion 46 is provided on an inner seat part 49 side in the axial direction.

In the shock absorber 1B of the third embodiment, the plurality of discs 106, the disc 102A, the disc 103A, and the disc 104, the disc valve 105, and the case member 107A of the second embodiment are provided between the disc 66 and a disc 65 in that order from a side of a disc 66 with the mounting shaft part 28B of the piston rod 21B fitted to inner sides thereof. At this time, the case member 107A is directed so that an outer cylindrical part 112 and an inner cylindrical part 113A are positioned on a shaft step part 29 side with respect to a bottom part 111A.

A plurality of (specifically, two) discs 84 similar to those in the second embodiment, a disc 251, and a washer 221 are provided on a side of a extension-side main valve 91 opposite to the piston 18 in that order from the side of the main valve 91 with the mounting shaft part 28B of the piston rod 21B fitted to inner sides thereof. A nut 108 is screwed onto a male screw 32 of a screw shaft part 31 protruding further than the washer 221 of the piston rod 21B. The nut 108 is in contact with the washer 221. The disc 251 is a part similar to the disc 66 and has an outer diameter smaller than an outer diameter of the main valve 91 and larger than an outer diameter of the washer 221. The disc 251 is thinner and less rigid than the washer 221.

A disc 62B, which is partially different from the disc 62, is provided between the inner seat part 49 and the main valve 71 of the piston 18B. As illustrated in FIG. 11, the disc 62B includes a notch part 255 formed from an intermediate position on an outer side of the inner seat part 49 in the radial direction to an inner circumferential edge portion. The notch part 255 allows passages in a plurality of passage holes 39 and an annular groove 56 to constantly communicate with a passage in the large diameter hole portion 46B of the piston 18B and the piston rod passage part 51B in the passage notch part 30B of the piston rod 21B. The notch part 255 is formed at the time of press-forming the disc 62B.

As illustrated in FIG. 10, a disc 82B that is partially different from the disc 82 is provided between the inner seat part 47 of the piston 18B and the main valve 91. A notch part for forming a passage is not formed in the disc 82B.

As in the second embodiment, a case inner chamber 165A formed between the case member 107A and the disc valve 105 constantly communicates with the piston rod passage part 51B in the passage notch part 30B of the piston rod 21B via a chamber passage part 131A in a plurality of passage grooves 121A of the case member 107A. The passage in the large diameter hole portion 46B of the piston 18B also constantly communicates with the piston rod passage part 51B. Therefore, the case inner chamber 165A constantly communicates with a lower chamber 20 via the chamber passage part 131A in the passage grooves 121A, the piston rod passage part 51B in the passage notch part 30B of the piston rod 21B, the passage in the large diameter hole portion 46B of the piston 18B, the passage in the notch part 255 of the disc 62B, and the passages in the annular groove 56 and the plurality of passage holes 39 of the piston 18.

An inner circumferential side of the disc valve 105 including an inner circumferential side separable part 152 of an outer annular part 141 constitutes a sub-valve 171 that can be separated from and seated on a second valve seat 135. The sub-valve 171 is provided on an upper chamber 19 side between the upper chamber 19 and the lower chamber 20 and provided on the case inner chamber 165A side between the upper chamber 19 and the case inner chamber 165A.

When the sub-valve 171 is separated from the second valve seat 135, the upper chamber 19 and the case inner chamber 165A are allowed to communicate with each other via a gap between the sub-valve 171 and the second valve seat 135 and a passage between the outer annular part 141 and an inner annular part 142 of the disc valve 105, and thereby the upper chamber 19 is allowed to communicate with the lower chamber 20. At this time, the sub-valve 171 suppresses a flow of an oil fluid between the sub-valve 171 and the second valve seat 135 to generate a damping force. The sub-valve 171 is an inflow valve that opens when the oil fluid is caused to flow into the case inner chamber 165A from the upper chamber 19 via the gap between the sub-valve 171 and the second valve seat 135. The sub-valve 171 is a check valve that restricts an outflow of the oil fluid from the case inner chamber 165A to the upper chamber 19 via the gap between the sub-valve 171 and the second valve seat 135.

The passage between the sub-valve 171 and the second valve seat 135 that appears when the valve opens, the passage between the outer annular part 141 and the inner annular part 142 of the disc valve 105, the case inner chamber 165A, the chamber passage part 131A in the plurality of passage grooves 121A of the case member 107A, the piston rod passage part 51B in the passage notch part 30B of the piston rod 21B, the passage in the large diameter hole portion 46B of the piston 18B, the passage in the notch part 255 of the disc 62B, and the passages in the annular groove 56 and the plurality of passage holes 39 constitute a second passage 172B through which the oil fluid flows out from the upper chamber 19 on an upstream side to the lower chamber 20 on a downstream side in the cylinder 2 due to the piston 18B moving to the upper chamber 19 side. The second passage 172B is a passage on the extension side through which the oil fluid flows out from the upper chamber 19 on the upstream side toward the lower chamber 20 on the downstream side when the piston 18B moves to the upper chamber 19 side, that is, in an extension stroke.

The sub-valve 171 and the second valve seat 135 are provided in the second passage 172B on the extension side. The sub-valve 171 and the second valve seat 135 constitute an extension-side second damping force generation mechanism 173 that opens and closes the second passage 172B and suppresses a flow of the oil fluid from the second passage 172B to the lower chamber 20 to generate a damping force. As described above, the second damping force generation mechanism 173 serving as the compression-side second damping force generation mechanism in the second embodiment serves as the extension-side second damping force generation mechanism in the third embodiment. The sub-valve 171 constituting the extension-side second damping force generation mechanism 173 is an extension-side sub-valve. The second damping force generation mechanism 173 including the sub-valve 171 and the second valve seat 135 allows the piston rod 21 to be inserted through a radial inner side thereof and is disposed on the upper chamber 19 side between the two chambers, that is, the upper chamber 19 and the lower chamber 20.

In the second passage 172B, when the second damping force generation mechanism 173 is in an open state, the passage in the notch part 255 of the disc 62B becomes the narrowest in portions having a fixed flow path cross-sectional area and is narrowed more than the front and rear thereof. The passage in the notch part 255 of the disc 62B is an orifice 175B in the second passage 172B. The orifice 175B is disposed downstream of the sub-valve 171 in a flow of the oil fluid when the sub-valve 171 opens and the oil fluid flows in the second passage 172B. The orifice 175B is provided on the lower chamber 20 side with respect to the sub-valve 171 in the second passage 172B.

The extension-side second passage 172B that allows the upper chamber 19 and the lower chamber 20 to communicate with each other is parallel to a first passage 92 which is also an extension-side passage allowing the upper chamber 19 and the lower chamber 20 to communicate with each other. A first damping force generation mechanism 41 is provided in the first passage 92, and the second damping force generation mechanism 173 is provided in the second passage 172B. Therefore, the first damping force generation mechanism 41 and the second damping force generation mechanism 173, which are both on the extension side, are disposed in parallel.

An outer circumferential side of the disc valve 105 including the outer circumferential side separable part 151 of the outer annular part 141 constitutes a sub-valve 181 that can be separated from and seated on a first valve seat 115. The sub-valve 181 is provided on the upper chamber 19 side between the upper chamber 19 and the lower chamber 20 and is provided on the upper chamber 19 side between the upper chamber 19 and the case inner chamber 165A.

When the sub-valve 181 is separated from the first valve seat 115, the case inner chamber 165A and the upper chamber 19 are allowed to communicate with each other via a gap between the sub-valve 181 and the first valve seat 115, and thereby the upper chamber 19 is allowed to communicate with the lower chamber 20. At this time, the sub-valve 181 suppresses the flow of the oil fluid between the sub-valve 181 and the first valve seat 115 to generate a damping force. The sub-valve 181 is a discharge valve that opens when the oil fluid is discharged from the inside of the case inner chamber 165A to the upper chamber 19 via the gap between the sub-valve 181 and the first valve seat 115. The sub-valve 181 is a check valve that restricts an inflow of the oil fluid from the upper chamber 19 into the case inner chamber 165A via the gap between the sub-valve 181 and the first valve seat 115.

The passages in the plurality of passage holes 39 and the annular groove 56 of the piston 18B, the passage in the notch part 255 of the disc 62B, the passage in the large diameter hole portion 46B of the piston 18B, the piston rod passage part 51B in the passage notch part 30B of the piston rod 21B, the chamber passage part 131A in the passage grooves 121A of the case member 107A, the case inner chamber 165A, and the passage between the sub-valve 181 and the first valve seat 115 that appears when the valve opens constitute a second passage 182B through which the oil fluid flows out from the lower chamber 20 on an upstream side to the upper chamber 19 on a downstream side in the cylinder 2 due to the piston 18 moving to the lower chamber 20 side. The second passage 182B is a compression-side passage through which the oil fluid flows out from the lower chamber 20 on the upstream side toward the upper chamber 19 on the downstream side when the piston 18 moves to the lower chamber 20 side, that is, in a compression stroke.

The sub-valve 181 and the first valve seat 115 are provided in the second passage 182B on the compression side. Thereby, a compression-side second damping force generation mechanism 183 that opens and closes the second passage 182B and suppresses a flow of the oil fluid from the second passage 182B to the upper chamber 19 to generate a damping force is constituted. As described above, the second damping force generation mechanism 183 serving as the extension-side second damping force generation mechanism in the second embodiment serves as the compression-side second damping force generation mechanism in the third embodiment. The sub-valve 181 constituting the compression-side second damping force generation mechanism 183 is a compression-side sub-valve. The second damping force generation mechanism 183 including the sub-valve 181 and the first valve seat 115 allows the piston rod 21B to be inserted through a radial inner side thereof and is disposed on the upper chamber 19 side between the two chambers, that is, the upper chamber 19 and the lower chamber 20.

In the second passage 182B, when the second damping force generation mechanism 183 is in an open state, the passage in the notch part 255 of the disc 62B becomes the narrowest in portions having a fixed flow path cross-sectional area and is narrowed more than the front and rear thereof. The passage in the notch part 255 of the disc 62B serves as the orifice 175B also in the second passage 182B. The orifice 175B is common to the second passages 172B and 182B. The orifice 175B is disposed upstream of the sub-valve 181 in a flow of the oil fluid when the sub-valve 181 opens and the oil fluid flows in the second passage 182B. The orifice 175B is provided on the lower chamber 20 side with respect to the sub-valve 181 in the second passage 182B. The orifice 175B is formed by cutting out the disc 62B that comes into contact with the piston 18B among the parts constituting the first damping force generation mechanism 42.

The compression-side second passage 182B that allows the upper chamber 19 and the lower chamber 20 to communicate with each other is parallel to the first passage 72 that is also a compression-side passage allowing the upper chamber 19 and the lower chamber 20 to communicate with each other except for the passages in the plurality of passage holes 39 and the annular groove 56 on the lower chamber 20 side. In this parallel portion, the first damping force generation mechanism 42 is provided in the first passage 72, and the second damping force generation mechanism 183 is provided in the second passage 182B. Therefore, the first damping force generation mechanism 42 and the second damping force generation mechanism 183, which are both on the compression side, are disposed in parallel.

As described above, the second damping force generation mechanisms 173 and 183 include the annular first valve seat 115 formed on the outer cylindrical part 112 of the bottomed cylindrical case member 107A having the bottom part 111A, the outer cylindrical part 112, and the inner cylindrical parts 113A and 231, the annular disc valve 105 in which the outer circumferential side separable part 151 on the outer circumferential side is separably disposed on the first valve seat 115 of the case member 107A, and the second valve seat 135 provided on a side of the disc valve 105 opposite to the first valve seat 115 and configured to separably support the inner circumferential side separable part 152 of the disc valve 105 on a radial inner side of the outer circumferential side separable part 151.

When the piston 18B and the like are assembled to the piston rod 21B, an annular member 67, the disc 66, the plurality of discs 106, the disc 102A, the disc 103A, the disc 104, the disc valve 105, and the case member 107A are stacked in that order on the shaft step part 29 while the screw shaft part 31 and the mounting shaft part 28B of the piston rod 21B are inserted therethrough. At this time, the case member 107A is directed so that the outer cylindrical part 112 and the inner cylindrical part 113A are positioned on a shaft step part 29 side with respect to the bottom part 111A. In addition, the disc 65, a plurality of discs 64, a plurality of discs 63, the disc 62B, and the piston 18B are stacked in that order on the case member 107A while the screw shaft part 31 and the mounting shaft part 28 are inserted therethrough.

At this time, the piston 18B is directed so that the large diameter hole portion 46B is positioned on the shaft step part 29 side with respect to the small diameter hole portion 45B. In addition, the disc 82B, a plurality of discs 83, the plurality of discs 84, the disc 251, and the washer 221 are stacked in that order on the piston 18B while the screw shaft part 31 and the mounting shaft part 28 are inserted therethrough.

In this state, the nut 108 is screwed onto the male screw 32 of the screw shaft part 31 of the piston rod 21B protruding further than the washer 221 so that inner circumferential sides of the nut 108 and the shaft step part 29 are clamped together in the axial direction.

In this state, inner circumferential sides of the disc valve 105 and the discs 104, 103A, and 102A constituting the second valve seat 135 are clamped by the inner cylindrical part 113A and the discs 106 of the case member 107A. At this time, in the disc valve 105, the inner annular part 142 is clamped, and the support part 143 and the outer annular part 141 are not clamped. At the same time, the sub-valve 171 of the outer annular part 141 of the disc valve 105 comes into contact with the second valve seat 135 at the inner circumferential side separable part 152 from the piston 18B side over the entire circumference, and the sub-valve 181 of the outer annular part 141 of the disc valve 105 comes into contact with the first valve seat 115 at the outer circumferential side separable part 151 from a side opposite to the piston 18B over the entire circumference. At this time, since the second valve seat 135 is positioned on the piston 18 side in the axial direction with respect to the first valve seat 115, the outer annular part 141 is deformed in a tapered shape such that it approaches the piston 18 in the axial direction toward the inner side in the radial direction.

In the extension stroke, a pressure of the upper chamber 19 increases and a pressure of the lower chamber 20 decreases as the piston 18B moves to the upper chamber 19 side. When a piston speed is in a region having a higher speed than a first predetermined value in which the second damping force generation mechanism 173 opens and in an extremely low speed region having a lower speed than a second predetermined value that is higher speed than the first predetermined value, the second damping force generation mechanism 173 opens while the first damping force generation mechanism 41 is in a closed state.

That is, the sub-valve 171 is separated from the second valve seat 135 to allow the upper chamber 19 and the lower chamber 20 to communicate with each other through the extension-side second passage 172B. Therefore, the oil fluid of the upper chamber 19 flows to the lower chamber 20 via the passage between the sub-valve 171 and the second valve seat 135, the passage between the outer annular part 141 and the inner annular part 142 of the disc valve 105, the case inner chamber 165A, the chamber passage part 131A in the passage grooves 121A of the case member 107A, the piston rod passage part 51B in the passage notch part 30B of the piston rod 21B, the passage in the large diameter hole portion 46B of the piston 18B, the orifice 175B, and the passages in the annular groove 56 and the plurality of passage holes 39 of the piston 18B. Thereby, even in the extremely low speed region in which the piston speed is lower than the second predetermined value, a damping force of the valve properties can be obtained.

In the extension stroke, in a normal speed region in which the piston speed is equal to or higher than the second predetermined value, the first damping force generation mechanism 41 opens while the second damping force generation mechanism 173 remains in an open state. That is, the sub-valve 171 is separated from the second valve seat 135 to cause the oil fluid to flow from the upper chamber 19 to the lower chamber 20 through the extension-side second passage 172B. At this time, when a flow of the oil fluid is reduced by the orifice 175B provided downstream of the sub-valve 171 of the second passage 172B, a pressure applied to the main valve 91 increases, a differential pressure increases, and the main valve 91 is separated from the valve seat part 48 to cause the oil fluid to flow from the upper chamber 19 to the lower chamber 20 through the extension-side first passage 92. Therefore, the oil fluid of the upper chamber 19 flows to the lower chamber 20 via the passages in the plurality of passage holes 37 and the annular groove 55 and the passage between the main valve 91 and the valve seat part 48. Thereby, even in the normal speed region in which the piston speed is equal to or higher than the second predetermined value, a damping force of the valve properties can be obtained. A rate of increase in the damping force on the extension side with respect to an increase in the piston speed in the normal speed region is lower than a rate of increase in the damping force on the extension side with respect to an increase in the piston speed in the extremely low speed region.

In the extension stroke, in the normal speed region in which the piston speed is equal to or higher than the second predetermined value, a differential pressure between the upper chamber 19 and the lower chamber 20 is larger than that in the low speed region in which the piston speed is equal to or higher than the first predetermined value and less than the second predetermined value. Since the first passage 92 is not narrowed by an orifice, the oil fluid can be caused to flow through the first passage 92 at a high flow rate when the main valve 91 is opened. In addition to this, when the second passage 172B is narrowed by the orifice 175B, deformation of the outer annular part 141 on the sub-valve 171 side can be curbed.

At this time, a pressure in an opposite direction from the upper chamber 19 and the case inner chamber 165A is applied to the sub-valve 181 in a closed state. The sub-valve 171 opens to allow the upper chamber 19 and the case inner chamber 165A to communicate with each other, and the second passage 172B is narrowed by the orifice 175B. Therefore, an increase in the pressure of the case inner chamber 165A becomes equal to an increase in the pressure of the upper chamber 19, and a pressure difference between the case inner chamber 165A and the upper chamber 19 is inhibited from becoming large. Therefore, the pressure difference between the case inner chamber 165A and the upper chamber 19 received by the sub-valve 181 in a closed state is inhibited from becoming large. Therefore, a large back pressure from the upper chamber 19 side toward the case inner chamber 165A side can be inhibited from being applied to the sub-valve 181 side of the outer annular part 141.

In the shock absorber 1B, flow paths for allowing the oil fluid to flow from the upper chamber 19 to the lower chamber 20 in the extension stroke are provided with the first passage 92 and the second passage 172B in parallel, and the main valve 91 and the sub-valve 171 are provided in parallel. The orifice 175B is connected in series to the sub-valve 171.

In the compression stroke, a pressure of the lower chamber 20 increases and a pressure of the upper chamber 19 decreases as the piston 18B moves to the lower chamber 20 side. When the piston speed is in a region having a higher speed than a third predetermined value in which the second damping force generation mechanisms 183 opens and in an extremely low speed region having a lower speed than a fourth predetermined value that is higher speed than the third predetermined value, the second damping force generation mechanism 183 opens while the first damping force generation mechanism 42 is in a closed state.

That is, the sub-valve 181 is separated from the first valve seat 115 to allow the lower chamber 20 and the upper chamber 19 to communicate with each other through the compression-side second passage 182B. Therefore, the oil fluid of the lower chamber 20 flows to the upper chamber 19 via the passages in the plurality of passage holes 39 and the annular groove 56 of the piston 18, the orifice 175, the passage in the large diameter hole portion 46B of the piston 18B, the piston rod passage part 51B in the passage notch part 30B of the piston rod 21B, the chamber passage part 131A in the passage grooves 121A of the case member 107A, the case inner chamber 165A, and the passage between the sub-valve 181 and the first valve seat 115. Thereby, even in the extremely low speed region in which the piston speed is lower than the fourth predetermined value, a damping force of the valve properties can be obtained.

In the compression stroke, in the normal speed region in which the piston speed is equal to or higher than the fourth predetermined value described above, the first damping force generation mechanism 42 opens while the second damping force generation mechanism 183 remains in an open state. That is, when the sub-valve 181 is separated from the first valve seat 115 to cause the oil fluid to flow from the lower chamber 20 to the upper chamber 19 through the compression-side second passage 182B, since a flow rate of the oil fluid in the second passage 182B is reduced by the orifice 175B, a differential pressure generated in the main valve 71 increases. Therefore, the main valve 71 is separated from a valve seat part 50 to cause the oil fluid to flow from the lower chamber 20 to the upper chamber 19 through the compression-side first passage 72. Therefore, the oil fluid of the lower chamber 20 flows via the passages in the plurality of passage holes 39 and the annular groove 56 and the passage between the main valve 71 and the valve seat part 50. Thereby, even in the normal speed region in which the piston speed is equal to or higher than the fourth predetermined value, a damping force of the valve properties can be obtained. A rate of increase in the damping force on the compression side with respect to an increase in the piston speed in the normal speed region is lower than a rate of increase in the damping force on the compression side with respect to an increase in the piston speed in the extremely low speed region.

In the compression stroke, a differential pressure between the lower chamber 20 and the upper chamber 19 in the normal speed region in which the piston speed is equal to or higher than the fourth predetermined value is larger than that in the low speed region. However, since the second passage 182B includes the orifice 175B provided upstream of the sub-valve 181, a flow rate to the sub-valve 181 is reduced. Therefore, when the main valve 71 opens, the oil fluid can be caused to flow at a high flow rate via the first passage 72. Thereby, since the flow rate flowing through the sub-valve 181 is reduced, valve rigidity of the sub-valve 181 can be reduced. Therefore, a damping force in the normal speed region of the piston speed can be reduced, and the degree of freedom in design can be expanded.

Also, at this time (when the piston speed is high), although the differential pressure between the lower chamber 20 and the upper chamber 19 increases, when the second passage 182B is narrowed by the orifice 175B, a differential pressure between the inside of case inner chamber 165A and the upper chamber 19 can be inhibited from becoming too large. Further, the oil fluid can be caused to flow at a high flow rate via the first passage 72 by opening the main valve 71, and thereby deformation of the outer annular part 141 on the sub-valve 181 side can be curbed.

At this time, a pressure in an opposite direction from the case inner chamber 165A and the upper chamber 19 is applied to the sub-valve 171 in a closed state. Although the differential pressure between the lower chamber 20 and the upper chamber 19 is large, the upper chamber 19 and the case inner chamber 165A communicate with each other due to opening of the sub-valve 181, and the orifice 175B is provided between the case inner chamber 165A and the lower chamber 20 which are upstream of the sub-valve 171. Therefore, a pressure in the case inner chamber 165A can be inhibited from increasing too much. Therefore, a differential pressure generated on the sub-valve 171 side of the outer annular part 141 is small, and a large back pressure from the case inner chamber 165A side to the upper chamber 19 side can be inhibited from being applied to the sub-valve 171 side of the outer annular part 141.

In the shock absorber 1, flow paths for allowing the oil fluid to flow from the lower chamber 20 to the upper chamber 19 in the compression stroke are provided with the first passage 72 and the second passage 182B in parallel, and the main valve 71 and the sub-valve 181 are provided in parallel. The orifice 175B is connected in series to the sub-valve 181 in the second passage 182B.

Further, in the compression stroke, damping force characteristics due to the damping valve mechanism 197 are also combined.

Also in the third embodiment, any one of the above-described disc valves 105a to 105d can be selected and applied instead of the disc valve 105.

Fourth Embodiment

Next, a fourth embodiment will be described mainly on the basis of FIG. 12, focusing on differences from the second embodiment. Portions common to those in the second embodiment will be denoted by the same terms and the same reference signs.

Figure 12:
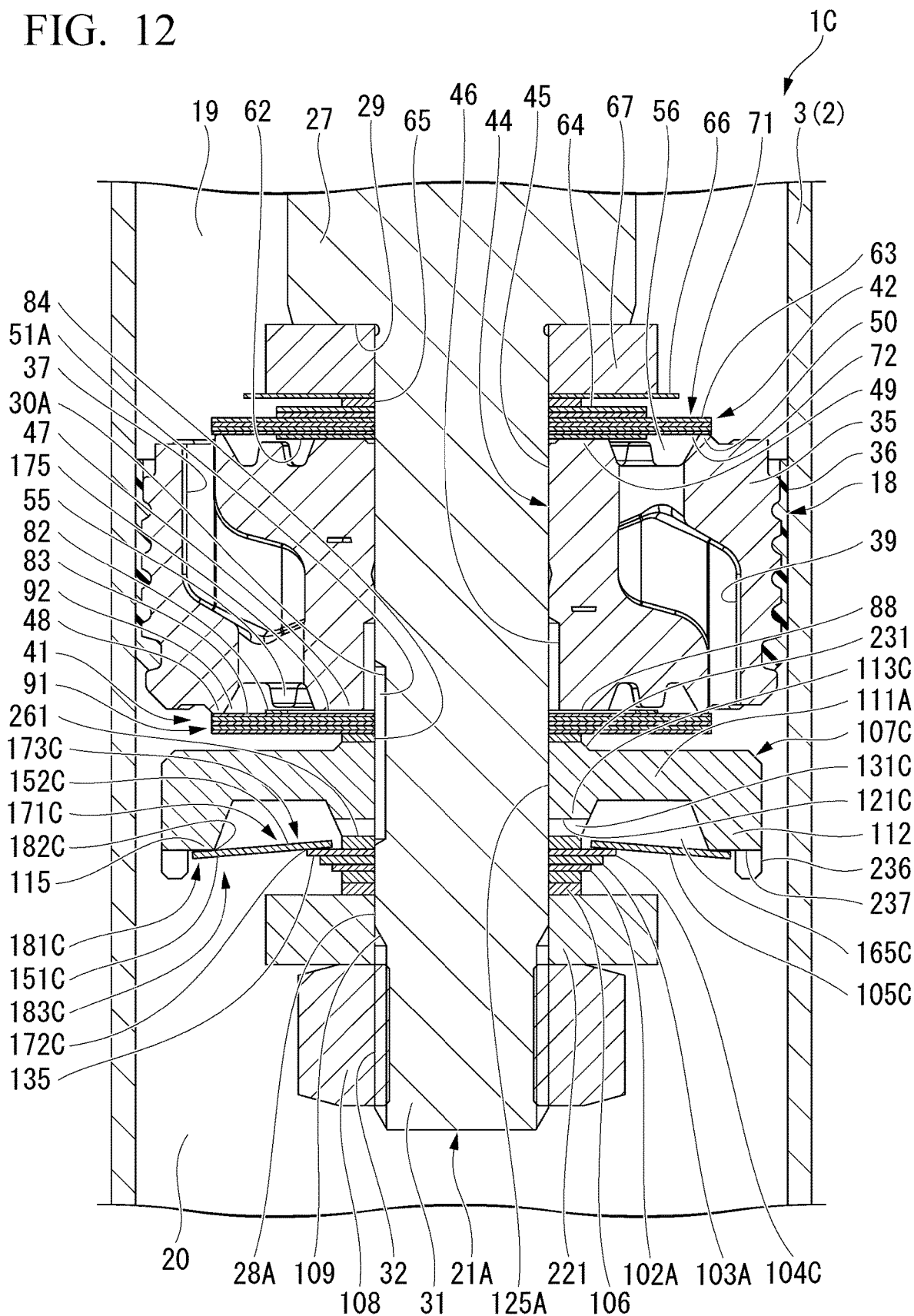
FIG. 12 is a cross-sectional view illustrating a main part of a shock absorber of a fourth embodiment according to the present invention.

In a shock absorber 1C of the fourth embodiment, as illustrated in FIG. 12, a case member 107C that is partially different from the case member 107A of the second embodiment, one disc 261, and one disc 104C that is different from the disc 104 of the second embodiment only in that an outer diameter is small are provided between a disc 84 and a disc 103A similar to those in the second embodiment in that order from a side of the disc 84 with a mounting shaft part 28A of the piston rod 21A fitted to inner sides thereof.

The case member 107C includes an inner cylindrical part 113C having an axial length shorter than that of the inner cylindrical part 113A of the second embodiment. A passage groove 121C having a depth smaller than that of the passage groove 121A is formed in the inner cylindrical part 113C to penetrate in the radial direction. The inside of the passage groove 121C serves as a chamber passage part 131C. The disc 261 is made of a metal and has a bored disc shape having a certain thickness into which the mounting shaft part 28A of the piston rod 21A can be fitted. The disc 261 has an outer circumferential surface formed in a cylindrical surface and has the same outer diameter as an outer diameter of a distal end surface on a side of the inner cylindrical part 113C opposite to a bottom part 111A. The case member 107C includes a distal end cylindrical part 236 (restricting part) having a cylindrical shape that protrudes in a direction opposite to the bottom part 111A from an outer circumferential side of an outer cylindrical part 112 on a side opposite to the bottom part 111A in the axial direction.

The distal end cylindrical part 236 protrudes from a distal end surface of the outer cylindrical part 112 on a side opposite to the bottom part 111A in a direction perpendicular to the distal end surface. An outer circumferential surface of the bottom part 111A, an outer circumferential surface of the outer cylindrical part 112, and an outer circumferential surface of the distal end cylindrical part 236 are disposed on the same cylindrical surface. An inner circumferential surface of the distal end cylindrical part 236 is a cylindrical surface with a central axis of the cylindrical surface, that is, a central axis of the case member 107C as a center. A plurality of through grooves 237 which open to the distal end surface on a side opposite to the bottom part 111A and penetrate in the radial direction are formed in the distal end cylindrical part 236 at intervals in a circumferential direction.

In the shock absorber 1C of the fourth embodiment, one disc valve 105C which is partially different from the disc valve 105 of the first and second embodiments is used. The disc valve 105C is a bored disc-shaped plain disc having a certain thickness similar to the outer annular part 141 of the disc valve 105 of the first and second embodiments. The disc valve 105C has an outer diameter the same as the outer diameter of the outer annular part 141 and an inner diameter smaller than the inner diameter of the outer annular part 141. The inner diameter of the disc valve 105C is smaller than an outer diameter of the disc 104C and larger than an outer diameter of the disc 261. The inner annular part 142 and the support part 143 as in the disc valve 105 are not provided in the disc valve 105C. A thickness of the disc 261 is larger than a thickness of the disc valve 105C.

The outer cylindrical part 112 of the case member 107C constitutes a first valve seat 115 similar to that of the first embodiment where the disc valve 105C is separated and seated at an outer circumferential side separable part 151C on the outer circumferential side. The distal end cylindrical part 236 provided on a side of the outer cylindrical part 112 opposite to the bottom part 111A has an inner diameter slightly larger than an outer diameter of the disc valve 105C and restricts a radial movement of the disc valve 105C by coming into contact with the disc valve 105C.

The disc 104C, together with the discs 103A and 102A stacked thereon, constitutes a bendable second valve seat 135 similar to that of the second embodiment where the disc valve 105C is separated and seated at an inner circumferential side separable part 152C on the inner circumferential side. The case member 107C, the disc valve 105C, the disc 104C, and the disc 261 form a case inner chamber 165C therein. The case inner chamber 165C constantly communicates with a piston rod passage part 51A in a passage notch part 30A of the piston rod 21A via the chamber passage part 131C in the passage groove 121C of the inner cylindrical part 113C.

Similarly to the sub-valve 171 of the second embodiment, when a sub-valve 171C including the inner circumferential side separable part 152C on the inner circumferential side of the disc valve 105C is separated from the second valve seat 135, a lower chamber 20 and the case inner chamber 165C are allowed to communicate with each other via a gap between the sub-valve 171C and the second valve seat 135. Thereby, the lower chamber 20 is allowed to communicate with an upper chamber 19.

The passage between the sub-valve 171C and the second valve seat 135 that appears when the valve opens, the case inner chamber 165C, the chamber passage part 131C in the passage groove 121C of the case member 107C, the piston rod passage part 51A in the passage notch part 30A of the piston rod 21A, a passage in a large diameter hole portion 46 of a piston 18, a passage in a notch part 88 of a disc 82, and passages in an annular groove 55 and a plurality of passage holes 37 constitute a compression-side second passage 172C, similar to the second passages 172 and 172A of the first and second embodiments, through which an oil fluid flows out from the lower chamber 20 on an upstream side to the upper chamber 19 on a downstream side in a cylinder 2 due to the piston 18 moving to the lower chamber 20 side. A compression-side second damping force generation mechanism 173C formed by the sub-valve 171C and the second valve seat 135 is provided in the second passage 172C and operates in the same manner as the second damping force generation mechanism 173 of the first and second embodiments to open and close the second passage 172C. In the second passage 172C, an orifice 175 is provided on the upper chamber 19 side with respect to the sub-valve 171C.

Similarly to the sub-valve 181 of the first and second embodiments, when a sub-valve 181C including the outer circumferential side separable part 151C on the outer circumferential side of the disc valve 105C is separated from the first valve seat 115, the case inner chamber 165C and the lower chamber 20 are allowed to communicate with each other via a gap between the sub-valve 181C and the first valve seat 115, and thereby the upper chamber 19 is allowed to communicate with the lower chamber 20.

The passages in the plurality of passage holes 37 and the annular groove 55 of the piston 18, the passage in the notch part 88 of the disc 82, the passage in the large diameter hole portion 46 of the piston 18, the piston rod passage part 51A in the passage notch part 30A of the piston rod 21A, the chamber passage part 131C in the passage groove 121C of the case member 107C, the case inner chamber 165C, and the passage between the sub-valve 181C and the first valve seat 115 that appears when the valve opens constitute an extension-side second passage 182C, similar to the second passages 182 and 182A of the first and second embodiments, through which the oil fluid flows out from the upper chamber 19 on an upstream side to the lower chamber 20 on a downstream side in the cylinder 2 due to the piston 18 moving to the upper chamber 19 side. An extension-side second damping force generation mechanism 183C formed by the sub-valve 181C and the first valve seat 115 is provided in the second passage 182C and operates in the same manner as the second damping force generation mechanism 183 of the first and second embodiments to open and close the second passage 182C. In the second passage 182C, the orifice 175 is provided on the upper chamber 19 side with respect to the sub-valve 181C.

When the piston 18 and the like are assembled to the piston rod 21A, an annular member 67, a disc 66, a disc 65, a plurality of discs 64, a plurality of discs 63, a disc 62, the piston 18, the disc 82, a plurality of discs 83, and the disc 84 are stacked in that order on a shaft step part 29 as in the second embodiment while a screw shaft part 31 and the mounting shaft part 28A of the piston rod 21A are inserted therethrough. Then, the case member 107C, the disc 261, and the disc valve 105C are stacked in that order on the disc 84 while the screw shaft part 31 and the mounting shaft part 28A are inserted therethrough. At this time, the case member 107C is directed so that the outer cylindrical part 112 and the inner cylindrical part 113C are positioned on a side opposite to the piston 18 with respect to the bottom part 111A. Then, the disc 104C, the disc 103A, the disc 102A, a plurality of discs 106, and a washer 221 are stacked in that order on the disc 261 and the disc valve 105C. In this state, a nut 108 is screwed onto a male screw 32 of the screw shaft part 31 of the piston rod 21 protruding further than the washer 221 so that inner circumferential sides of the nut 108 and the shaft step part 29 are clamped together in the axial direction.

In this state, the sub-valve 171C of the disc valve 105C comes into contact with the second valve seat 135 at the inner circumferential side separable part 152C from the piston 18 side over the entire circumference, and the sub-valve 181C of the disc valve 105C comes into contact with the first valve seat 115 at the outer circumferential side separable part 151C from a side opposite to the piston 18 over the entire circumference. At this time, since the second valve seat 135 is positioned on the piston 18 side in the axial direction with respect to the first valve seat 115, the disc valve 105C is deformed in a tapered shape such that it approaches the piston 18 in the axial direction toward the inner side in the radial direction. The disc valve 105C is not clamped at all in the axial direction. In other words, the disc valve 105C is a complete free valve that is not connected to other parts as a whole.

The shock absorber 1C of the fourth embodiment operates in the same manner as the shock absorbers 1 and 1A of the first and second embodiments.

Since the disc valve 105C is a free valve that is not connected to other parts, the shock absorber 1C of the fourth embodiment is not easily restricted by deformation. Therefore, the disc valve 105C can be more smoothly opened and closed.

Since the distal end cylindrical part 236 restricting radial movement of the disc valve 105C is provided on a side of the outer cylindrical part 112 of the case member 107C opposite to the bottom part 111A, the distal end cylindrical part 236 can position the disc valve 105C in the radial direction with respect to the case member 107C. Therefore, the disc valve 105C, that is not connected to other parts, being separated from the second valve seat 135 in the radial direction to open the second damping force generation mechanism 173C, and the disc valve 105C being shifted from the first valve seat 115 in the radial direction to open the second damping force generation mechanism 183C can be restricted.

Further, replacing the case member 107C, the disc 261, the disc valve 105C, and the disc 104C of the fourth embodiment with the case member 107A, the disc valve 105, and the disc 104 of the third embodiment can also be applied.

Fifth Embodiment

Next, a fifth embodiment will be described mainly on the basis of FIG. 13, focusing on differences from the first embodiment. Portions common to those in the first embodiment will be denoted by the same terms and the same reference signs.

Figure 13:
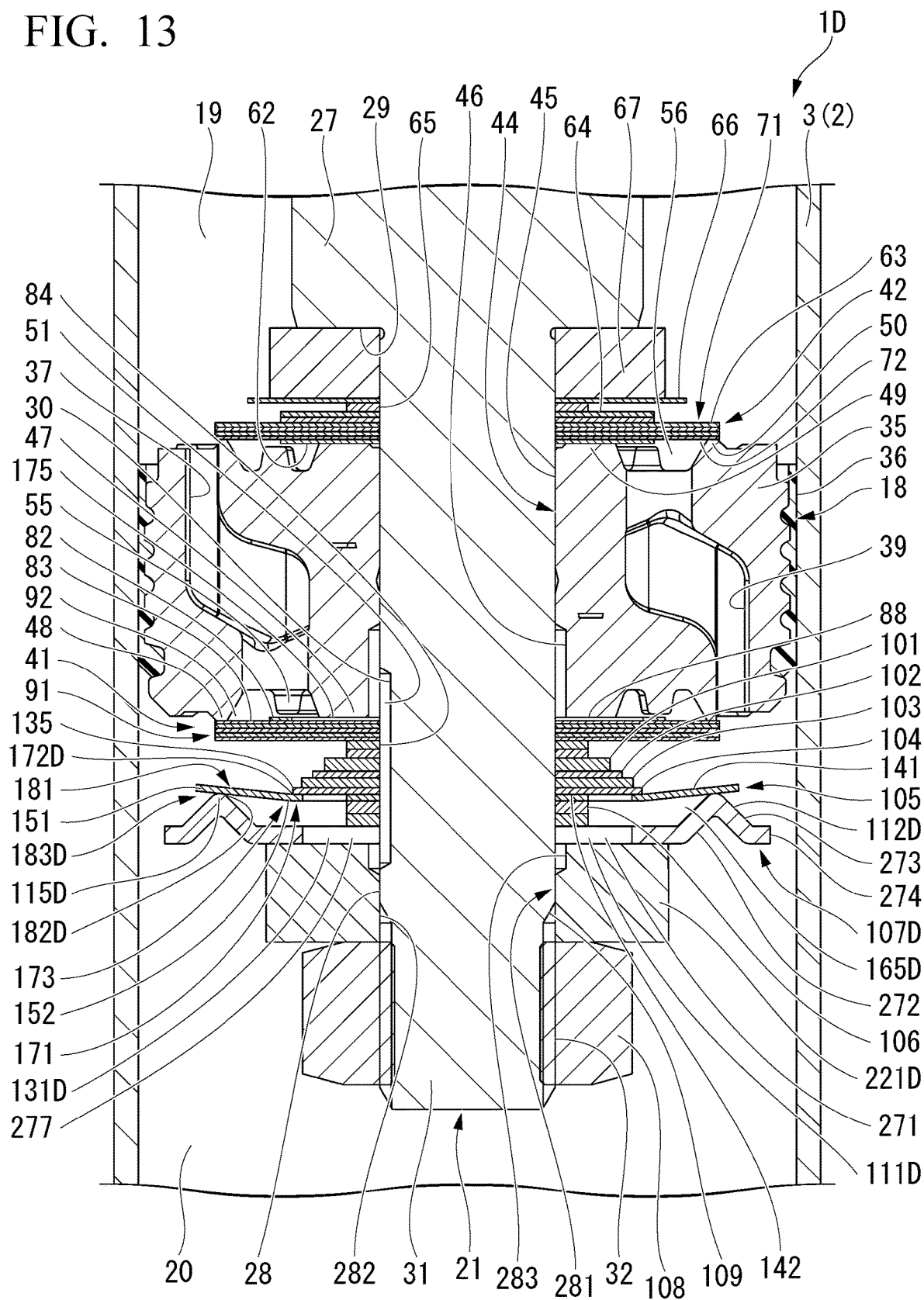
FIG. 13 is a cross-sectional view illustrating a main part of a shock absorber of a fifth embodiment according to the present invention.

In a shock absorber 1D of the fifth embodiment, as illustrated in FIG. 13, a case member 107D and a washer 221D are provided instead of the case member 107 of the first embodiment.

The case member 107D includes a bored disc-shaped substrate part 271 having a certain thickness into which a mounting shaft part 28 of a piston rod 21 can be fitted, an annular inner tapered part 272 that extends while a diameter thereof increases to one side in an axial direction from an outer circumferential edge portion of the substrate part 271, an annular outer tapered part 273 that extends while a diameter thereof increases to an opposite side in the axial direction from an end edge portion of the inner tapered part 272 on a side opposite to the substrate part 271, and a bored disc-shaped distal end plate part 274 disposed on the same plane as the substrate part 271 and extending outward in the radial direction from an end edge portion of the outer tapered part 273 on aside opposite to the inner tapered part 272. The case member 107D is formed by press forming from one plate material having a flat plate shape.

The case member 107D has a bottomed cylindrical shape in which the substrate part 271 and the distal end plate part 274 constitute a bottom part 111D, and the inner tapered part 272 and the outer tapered part 273 constitute a cylindrical part 112D. The case member 107D is directed so that the cylindrical part 112D protrudes from the bottom part 111D to a piston 18 side. A notch part 277 is formed in the substrate part 271 from an intermediate position on an outer side of a disc 106 in the radial direction to an inner circumferential edge portion. The notch part 277 is also formed by press forming. The notch part 277 constantly communicates with a piston rod passage part 51 in a passage notch part 30 of the piston rod 21. The case member 107D is thicker and more rigid than a disc valve 105. The notch part 277 is formed at the time of press forming of the case member 107D.

A corner part on a boundary side of the inner tapered part 272 and the outer tapered part 273 has an annular shape. An outer circumferential side separable part 151 of an outer annular part 141 of the disc valve 105 is a first valve seat 115D that is separated and seated. The first valve seat 115D is formed on the cylindrical part 112D and has an annular shape. The outer annular part 141 of the disc valve 105 closes a gap between the outer annular part 141 and the first valve seat 115D when the outer circumferential side separable part 151 is seated on the first valve seat 115D over the entire circumference, and opens the gap between the outer annular part 141 and the first valve seat 115D when the outer circumferential side separable part 151 is separated from the first valve seat 115D.

The disc valve 105, a plurality of discs 106, and the case member 107D form a case inner chamber 165D therein.

The washer 221D is made of a metal and has a bored disc shape having a certain thickness into which the mounting shaft part 28 of the piston rod 21 can be fitted. An insertion hole 281 in which the mounting shaft part 28 of the piston rod 21 is inserted is formed to penetrate in the axial direction in the washer 221D at a center in the radial direction. The insertion hole 281 includes a small diameter hole portion 282 on one side in the axial direction into which the mounting shaft part 28 of the piston rod 21 is fitted, and a large diameter hole portion 283 on the other side in the axial direction having a larger diameter than the small diameter hole portion 282. The washer 221D is directed so that the large diameter hole portion 283 is positioned on the piston 18 side with respect to the small diameter hole portion 282. The washer 221D has higher rigidity than the case member 107D made of a plate material and is in contact with the substrate part 271 of the case member 107D by surface contact to support the substrate part 271 on a side opposite to the piston 18.

The washer 221D is a washer part that covers an incomplete screw part 109 of the piston rod 21, and the case member 107D is a case part that forms the case inner chamber 165D. The case inner chamber 165D constantly communicates with a passage in the large diameter hole portion 283 of the washer 221D and the piston rod passage part 51 in the passage notch part 30 of the piston rod 21 via a chamber passage part 131D in the notch part 277 of the case member 107D. Therefore, the case inner chamber 165D constantly communicates with an upper chamber 19 via the chamber passage part 131D in the notch part 277, the passage in the large diameter hole portion 283 of the washer 221D, the piston rod passage part 51 in the passage notch part 30 of the piston rod 21, a passage in a large diameter hole portion 46 of the piston 18, a passage in a notch part 88 of a disc 82, and passages in an annular groove 55 and a plurality of passage holes 37 of the piston 18.

Within an axial range of the small diameter hole portion 282 of the washer 221D, the entire incomplete screw part 109 of the piston rod 21 is disposed, and a male screw 32 and the mounting shaft part 28 on both sides of the washer 221D in the axial direction are also disposed.

When the sub-valve 171 on the inner circumferential side including the inner circumferential side separable part 152 of the outer annular part 141 of the disc valve 105 is separated from the second valve seat 135, the lower chamber 20 and the case inner chamber 165D are allowed to communicate with each other via a gap between the sub-valve 171 and the second valve seat 135 and a passage between the outer annular part 141 and the inner annular part 142 of the disc valve 105, and thereby the lower chamber 20 is allowed to communicate with the upper chamber 19.

The passage between the sub-valve 171 and the second valve seat 135 that appears when the valve opens, the passage between the outer annular part 141 and the inner annular part 142 of the disc valve 105, the case inner chamber 165D, the chamber passage part 131D in the notch part 277 of the case member 107D, the passage in the large diameter hole portion 283 of the washer 221D, the piston rod passage part 51 in the passage notch part 30 of the piston rod 21, the passage in the large diameter hole portion 46 of the piston 18, the passage in the notch part 88 of the disc 82, and the passages in the annular groove 55 and the plurality of passage holes 37 constitute a compression-side second passage 172D, similar to the second passage 172 of the first embodiment, through which an oil fluid flows out from the lower chamber 20 on an upstream side to the upper chamber 19 on a downstream side in a cylinder 2 due to the piston 18 moving to the lower chamber 20 side. A compression-side second damping force generation mechanism 173 formed by the sub-valve 171 and the second valve seat 135 is provided in the second passage 172D and operates in the same manner as the second damping force generation mechanism 173 of the first embodiment to open and close the second passage 172D.

A sub-valve 181 including the outer circumferential side separable part 151 of the outer annular part 141 of the disc valve 105 can be separated from and seated on the first valve seat 115D. When the sub-valve 181 is separated from the first valve seat 115D, the case inner chamber 165D and the lower chamber 20 are allowed to communicate with each other via a gap between the sub-valve 181 and the first valve seat 115D, and thereby the upper chamber 19 is allowed to communicate with the lower chamber 20.

The passages in the plurality of passage holes 37 and the annular groove 55 of the piston 18, the passage in the notch part 88 of the disc 82, the passage in the large diameter hole portion 46 of the piston 18, the piston rod passage part 51 in the passage notch part 30 of the piston rod 21, the passage in the large diameter hole portion 283 of the washer 221D, the chamber passage part 131D in the notch part 277 of the case member 107D, the case inner chamber 165D, and the passage between the sub-valve 181 and the first valve seat 115D that appears when the valve opens constitute an extension-side second passage 182D, similar to the second passage 182 of the first embodiment, through which the oil fluid flows out from the upper chamber 19 on an upstream side to the lower chamber 20 on a downstream side in the cylinder 2 due to the piston 18 moving to the upper chamber 19 side. The sub-valve 181 and the annular first valve seat 115D that is formed on the outer cylindrical part 112D of the case member 107D are provided in the extension-side second passage 182D and constitute an extension-side second damping force generation mechanism 183D that opens and closes the second passage 182D to suppress a flow of the oil fluid from the second passage 182D to the lower chamber 20 to generates a damping force by operating in the same manner as the second damping force generation mechanism 183 of the first embodiment.

The shock absorber 1D of the fifth embodiment operates in the same manner as the shock absorber 1 of the first embodiment.

According to the shock absorber 1D of the fifth embodiment, since the case member 107D is formed by press-forming one plate material having a flat plate shape into a bottomed cylindrical shape having the bottom part 111D and the cylindrical part 112D, manufacture thereof is facilitated. The notch part 277 forming the chamber passage part 131D is also formed by press forming, manufacture of the case member 107D is further facilitated.

Further, in the fifth embodiment, any one of the above-described disc valves 105a to 105d can be selected and applied instead of the disc valve 105.

The first to fifth embodiments have described examples in which the present invention is used for a dual-tube type hydraulic shock absorber, but the present invention is not limited thereto, and the present invention may be used for a mono-tube type hydraulic shock absorber in which an outer tube is eliminated and a gas chamber is formed with a slidable partition on a side of the lower chamber 20 opposite to the upper chamber 19 in the cylinder 2, or can be used for any shock absorber including a pressure control valve that uses a packing valve having a structure in which a seal member is provided in a disc.

A first aspect of the embodiment described above includes a cylinder in which a working fluid is sealed, a piston provided to be slidable in the cylinder and partitioning the inside of the cylinder into two chambers, a piston rod connected to the piston and extending to the outside of the cylinder, a first passage and a second passage through which the working fluid flows out from the chamber on an upstream side to the chamber on a downstream side in the cylinder due to movement of the piston, a first damping force generation mechanism provided in the first passage formed in the piston to generate a damping force, and a second damping force generation mechanism disposed on one chamber side of the two chambers with the piston rod inserted therethrough and provided in the second passage in parallel with the first passage to generate a damping force, in which the second damping force generation mechanism includes an annular first valve seat formed on a cylindrical part of a bottomed cylindrical case member having the cylindrical part and a bottom part, an annular disc valve in which a separable part on an outer circumferential side is separably disposed on the first valve seat of the case member, and a second valve seat provided on a side of the disc valve opposite to the first valve seat, and configured to separably support the disc valve on a radial inner side of the separable part, the second passage includes a piston rod passage part formed by cutting out or penetrating the piston rod, and a chamber passage part which allows communication from the piston rod passage part to a case inner chamber between the bottom part of the case member and the disc valve, the second damping force generation mechanism opens while the first damping force generation mechanism is in a closed state in a region in which a piston speed is low, and both the first damping force generation mechanism and the second damping force generation mechanism open in a region in which the piston speed is higher than in the region in which the piston speed is low. Thereby, the structure can be simplified.

According to a second aspect, in the first aspect, the disc valve includes an outer annular part separably disposed on the first valve seat of the case member, an inner annular part through which the piston rod is inserted, and a support part connecting the outer annular part and the inner annular part, and the second valve seat is provided to be able to shut off a space between the outer annular part and the inner annular part by the piston rod inserted therethrough.

According to a third aspect, in the second aspect, the two support parts of the disc valve are provided, and the support parts are configured so that two outer connecting parts disposed on the same one side with respect to a center in a radial direction of the disc valve at a distance in a circumferential direction of the disc valve are connected to the outer annular part, two inner connecting parts disposed on the same opposite side with respect to the center in the radial direction of the disc valve at a distance in the circumferential direction of the disc valve are connected to the inner annular part, two connecting arm parts are provided to connect the outer connecting parts and the inner connecting parts which are close to each other in the circumferential direction of the disc valve, and a distance between the two inner connecting parts is larger than a distance between the two outer connecting parts.

According to a fourth aspect, in the second aspect, the two support parts of the disc valve are provided, and the support parts are configured so that two outer connecting parts disposed on the same straight line passing through a center of the disc valve are connected to the outer annular part, two inner connecting parts disposed on the same straight line passing through the center of the disc valve are connected to the inner annular part, and two connecting arm parts are provided to connect the outer connecting parts and the inner connecting parts that are distant from each other in the circumferential direction of the disc valve.

According to a fifth aspect, in any one of the first to fourth aspects, the second valve seat supporting the disc valve has a bendable configuration.

According to a sixth aspect, in any one of the first to fifth aspects, the case member includes a case part forming the chamber passage part and the case inner chamber, and a washer part covering an incomplete screw part of the piston rod.

According to a seventh aspect, in the sixth aspect, the case part and the washer part are separately formed.

According to an eighth aspect, in any one of the first to sixth aspects, a restricting part restricting movement of the disc valve in the radial direction is provided in the cylindrical part.

INDUSTRIAL APPLICABILITY

When the shock absorber described above is applied in the art, it is possible to provide a shock absorber in which the structure can be simplified.

REFERENCE SIGNS LIST 1, 1A to 1D Shock absorber
2 Cylinder
18, 18B Piston
19 Upper chamber
20 Lower chamber
21, 21A, 21B Piston rod 41, 42 First damping force generation mechanism
51, 51A, 51B Piston rod passage part
72, 92 First passage
105, 105a to 105d, 105C Disc valve
107 Case member
107A, 107C, 107D Case member (case part)
109 Incomplete screw part
115, 115D First valve seat
131, 131A, 131C, 131D Chamber passage part
135 Second valve seat
141 Outer annular part
142 Inner annular part
143, 143a to 143d Support part
151, 151C Outer circumferential side separable part (separable part)
161, 161a to 161d Outer connecting part
162, 162a to 162d Inner connecting part
163, 163 to 163d Connecting arm part
166 Washer part
167 Case part
172, 172A to 172D, 182, 182A to 182D Second passage
173, 173C, 183, 183C, 183D Second damping force generation mechanism
221, 221D Washer (washer part)
236 Distal end cylindrical part (restricting part)

The invention claimed is:

1. A shock absorber comprising:
a cylinder in which a working fluid is sealed;
a piston provided to be slidable in the cylinder and partitioning an inside of the cylinder into two chambers including a chamber on an upstream side and a chamber on a downstream side;
a piston rod connected to the piston and extending to an outside of the cylinder;
a first passage and a second passage through which the working fluid flows out from the chamber on an upstream side to the chamber on a downstream side in the cylinder due to movement of the piston;
a first damping force generation mechanism provided in the first passage formed in the piston to generate a damping force; and
a second damping force generation mechanism disposed on the chamber on the upstream side or the chamber on downstream side with the piston rod inserted therethrough and provided in the second passage in parallel with the first passage to generate a damping force, wherein
the second damping force generation mechanism includes:
an annular first valve seat formed on a cylindrical part of a bottomed cylindrical case member having the cylindrical part and a bottom part;
an annular disc valve which includes:
an outer annular part in which a separable part on an outer circumferential side is separably disposed on the first valve seat of the case member;
an inner annular part through which the piston rod in inserted, and
two support parts which connect between the outer annular part and the inner annular part; and
a second valve seat provided on a side of the disc valve opposite to the first valve seat, and configured to separably support the disc valve at a position between the separable part and the support parts in a radial direction of the disc valve,
the second passage includes:
a piston rod passage part formed by cutting out or penetrating the piston rod; and
a chamber passage part which allows communication from the piston rod passage part to a case inner chamber between the bottom part of the case member and the disc valve,
the second damping force generation mechanism opens while the first damping force generation mechanism is in a closed state in a region in which a piston speed is low, and
both the first damping force generation mechanism and the second damping force generation mechanism open in a region in which the piston speed is higher than in the region in which the piston speed is low, and
the support parts are configured so that:
two outer connecting parts disposed on a same one side with respect to a center in a radial direction of the disc valve at a distance in a circumferential direction of the disc valve are connected to the outer annular part;
two inner connecting parts disposed on a same opposite side with respect to the center in the radial direction of the disc valve at a distance in the circumferential direction of the disc valve are connected to the inner annular part;
two connecting arm parts are provided to connect the outer connecting parts and the inner connecting parts which are close to each other in the circumferential direction of the disc valve; and
a distance between the two inner connecting parts is larger than a distance between the two outer connecting parts.

2. The shock absorber according to claim 1, wherein the second valve seat supporting the disc valve has a bendable configuration.

3. The shock absorber according to claim 1, wherein the case member includes:
a case part forming the chamber passage part and the case inner chamber; and
a washer part covering an incomplete screw part of the piston rod.

4. The shock absorber according to claim 3, wherein the case part and the washer part are separately formed.

5. The shock absorber according to claim 1, wherein a restricting part restricting movement of the disc valve in the radial direction is provided in the cylindrical part.

* * * * *